(12) United States Patent
Hakim

(10) Patent No.: US 8,311,917 B2
(45) Date of Patent: Nov. 13, 2012

(54) METHODS AND APPARATUS FOR COLLATERAL-BASED FINANCIAL TRANSACTIONS

(75) Inventor: Omar Besim Hakim, Austin, TX (US)

(73) Assignee: Gold Innovations, LLC, Austin, TX (US)

(*) Notice: Subject to any disclaimer, the term of this patent is extended or adjusted under 35 U.S.C. 154(b) by 0 days.

(21) Appl. No.: 13/282,209

(22) Filed: Oct. 26, 2011

(65) Prior Publication Data

US 2012/0101936 A1    Apr. 26, 2012

Related U.S. Application Data

(60) Provisional application No. 61/406,587, filed on Oct. 26, 2010.

(51) Int. Cl.
*G06Q 40/00* (2012.01)
*G07B 17/00* (2006.01)
*G07F 19/00* (2006.01)

(52) U.S. Cl. .............. 705/35; 705/30; 705/36 T; 705/38
(58) Field of Classification Search .................... 705/30, 705/35, 36 T, 38
See application file for complete search history.

(56) References Cited

U.S. PATENT DOCUMENTS

| 8,055,567 | B2* | 11/2011 | Glinberg et al. ............ 705/36 R |
| 2007/0162365 | A1* | 7/2007 | Weinreb ......................... 705/35 |
| 2008/0195527 | A1* | 8/2008 | Barreiro et al. ................ 705/38 |
| 2008/0249932 | A1* | 10/2008 | Kuchinad et al. .............. 705/39 |
| 2009/0138383 | A1* | 5/2009 | Alba et al. ...................... 705/28 |
| 2010/0235270 | A1* | 9/2010 | Baker ............................. 705/35 |
| 2011/0016025 | A1* | 1/2011 | Gaisford ..................... 705/27.1 |
| 2011/0112951 | A1 | 5/2011 | Gould |
| 2012/0185367 | A1* | 7/2012 | Abramson et al. ............. 705/28 |

OTHER PUBLICATIONS

Zupanc, Thomas A. Capital Gains and Losses from Collectibles—Part I. Taxpro Journal. Spring 2008.*
Escala's Collateral Finance Corporation Named "Official Numismatic Lender" of American Numismatic Association Business Wire, p. NA Jul. 30, 2007.*
A-Mark Precious Metals Launches Lending Company Targeting the Rare Coin and Bullion Market. PR Newswire, p. NA Apr. 3, 2006.*
"Moare Coin, Metals, and Inflation Articles," Coinflation.com, 2004-2012 Coinflation (TM), 3 pages.
U.S. Appl. No. 13/282,197, filed Oct. 26, 2011, Omar Besim Hakim, all pages.

* cited by examiner

*Primary Examiner* — Scott Zare
(74) *Attorney, Agent, or Firm* — Stephen A. Mason; Meyertons, Hood, Kivlin, Kowert & Goetzel, P.C.

(57) ABSTRACT

Methods and apparatus for managing collateral based transactions are disclosed. In one embodiment, one or more processors perform defining collateral for a financial transaction, assessing a valuation of the collateral based upon a difference between a material value and a legal tender value of the legal tender precious metal coins, and determining terms of the financial transaction based on the valuation. In some embodiments, the collateral includes one or more legal tender precious metal coins.

30 Claims, 20 Drawing Sheets

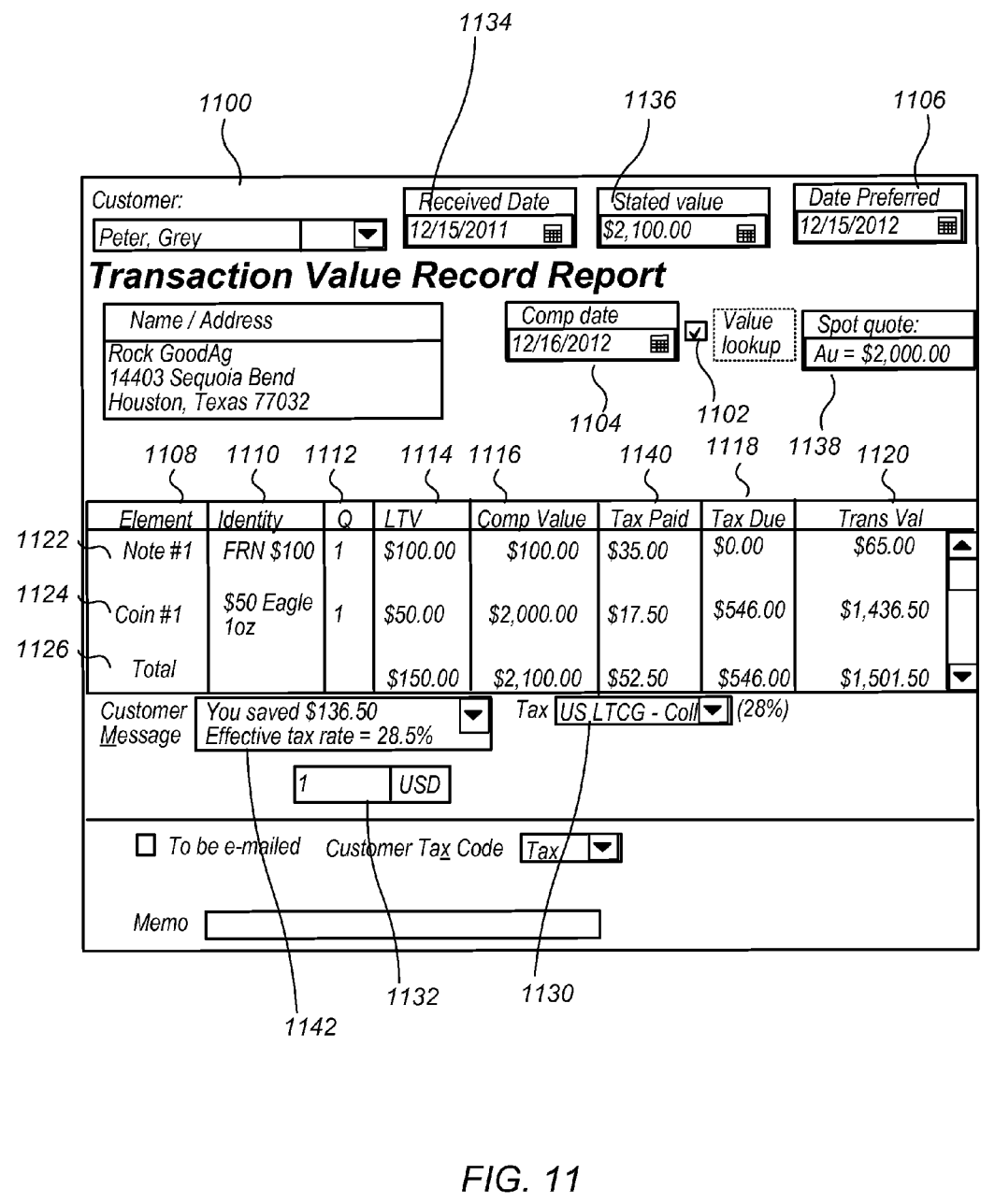

Transaction Value Record Report

| | Element | Identity | Q | LTV | Comp Value | Tax Paid | Tax Due | Trans Val |
|---|---|---|---|---|---|---|---|---|
| 1122 | Note #1 | FRN $100 | 1 | $100.00 | $100.00 | $35.00 | $0.00 | $65.00 |
| 1124 | Coin #1 | $50 Eagle 1oz | 1 | $50.00 | $2,000.00 | $17.50 | $546.00 | $1,436.50 |
| 1126 | Total | | | $150.00 | $2,100.00 | $52.50 | $546.00 | $1,501.50 |

Customer: Peter, Grey
Received Date: 12/15/2011
Stated value: $2,100.00
Date Preferred: 12/15/2012

Name/Address: Rock GoodAg, 14403 Sequoia Bend, Houston, Texas 77032

Comp date: 12/16/2012
Value lookup
Spot quote: Au = $2,000.00

Customer Message: You saved $136.50 Effective tax rate = 28.5%
Tax: US LTCG - Coll (28%)
1 USD ☐ To be e-mailed   Customer Tax Code: Tax Memo

FIG. 11

```
┌─────────────────────────────────────────────┐
│ Calculate a composition value based in part │
│      on the legal tender decomposition      │
│                    1212                      │
└─────────────────────────────────────────────┘
                      │
                      ▼
┌─────────────────────────────────────────────┐
│  Calculate a dual-treatment aggregate value │
│       based in part on the composition      │
│                    value                     │
│                    1214                      │
└─────────────────────────────────────────────┘
                      │
                      ▼
┌─────────────────────────────────────────────┐
│ Designate terms of the financial services   │
│  transaction for use in the proposed        │
│            transaction report                │
│                    1216                      │
└─────────────────────────────────────────────┘
```

*FIG. 12B*

METHODS AND APPARATUS FOR COLLATERAL-BASED FINANCIAL TRANSACTIONS

CLAIM OF PRIORITY TO PROVISIONAL APPLICATION

This application claims benefit of priority of U.S. Provisional Application Ser. No. 61/406,587 entitled "METHOD AND SYSTEM FOR DETERMINING, CALCULATING AND MANAGING THE TAXES OWED ON THE SALE OF LEGAL TENDER COINS WHICH HAVE A MATERIAL VALUE GREATER THAN THEIR LEGAL FACE VALUE" filed Oct. 26, 2010, the content of which is incorporated by reference herein in its entirety.

BACKGROUND

Description of the Related Art

Various market participants have provided accounting software to support financial activity. Accounting software is application software that records and processes accounting transactions within functional modules such as accounts payable, accounts receivable, payroll, and trial balance. Accounting software functions as an accounting information system. Accounting software may be developed in-house by the company or organization using the accounting software, may be purchased or licensed from a third party, or may be a combination of a third-party application software package with local modifications. Accounting software varies greatly in its complexity and cost.

Today, accounting software does not enable the recording of the decomposition of an accounting system entry (e.g., particular values or identities of bank notes, types of coins, or checks) within a particular currency. Currency refers to a generally accepted medium of exchange, which are most commonly the coins and banknotes of a particular government or region. Usually, a government legally defines its fiat currency (typically notes and coins issued by the central bank) to be legal tender, fixing a legal tender value that is independent of its material or composition value. Government decree, rather than material value, determines the value of money for accounting purposes.

As a result, bank deposits and currency transactions are generally tracked by an accounting system without regard to the legal tender composition of the transactions. For example, under Generally Accepted Accounting Principles in the United States (US GAAP), economic activity is measured in U.S. dollars, and transactions are expressed in U.S. dollars when recorded, without US GAAP requiring there to be a recorded difference between various forms of legal tender for the same legal tender value in an accounting system entry. See FASB Statement No. 168, The FASB Accounting Standards Codification™ and the Hierarchy of Generally Accepted Accounting Principles. For example, a $100 accounting system entry is not shown to be made up of two $50 bills or five $20 bills, etc.

SUMMARY

Various embodiments of methods and apparatus for recording decomposition of accounting system entries are disclosed. In some embodiments, one or more processors are employed to perform recording a legal tender value of an accounting system entry and recording a legal tender decomposition of the accounting system entry.

In some embodiments, the one or more processors are employed to perform reporting the legal tender decomposition of the accounting system entry and the legal tender value of the accounting system entry.

In some embodiments, the one or more processors are employed to perform calculating a composition value of the accounting system entry based at least in part on the legal tender decomposition of the accounting system entry.

In some embodiments, the one or more processors are employed to perform calculating a composition value of the accounting system entry based at least in part on the legal tender decomposition of the accounting system entry. In some such embodiments, the calculating the composition value is based at least in part on a material value of coins included in the legal tender decomposition.

In some embodiments, the one or more processors are employed to perform calculating a composition value of the accounting system entry based at least in part on the legal tender decomposition of the accounting system entry. In some such embodiments, the one or more processors are further employed to perform calculating a comparison of the legal tender value of the accounting system entry and the composition value of the accounting system entry. In some such embodiments, the one or more processors are further employed to perform reporting the legal tender value of accounting system entry, the composition value of the accounting system entry, and the comparison of the legal tender value of accounting system entry and the composition value of the accounting system entry.

In some embodiments, the one or more processors are employed to perform calculating a transaction value based at least in part on the comparison of the legal tender value of accounting system entry and the composition value of the accounting system entry.

In some embodiments, the one or more processors are employed to perform calculating a dual-treatment aggregate value based in part on the legal the legal tender decomposition of the accounting system entry and the legal tender value of the accounting system entry.

In some embodiments, the one or more processors are employed to perform calculating a first composition value of the accounting system entry based at least in part on the legal tender decomposition of the accounting system entry. In some such embodiments, the calculating the first composition value is based at least in part on a metal composition of coins included in the legal tender decomposition and a metal price on a first date. In some such embodiments, the one or more processors are further employed to perform calculating a second composition value of the accounting system entry based at least in part on the legal tender decomposition of the accounting system entry. In some such embodiments, the calculating the second composition value is based at least in part on a metal composition of coins included in the legal tender decomposition and a metal price on a second date. In some such embodiments, the one or more processors are further employed to perform calculating a comparison of the first composition value and the second composition value. In some such embodiments, the one or more processors are further employed to perform reporting the legal tender value of accounting system entry, the first composition value, the second composition value, and the comparison.

Some embodiments provide a system including at least one processor and a memory comprising program instructions. In some embodiments, the program instructions are executable by the at least one processor to record a legal tender value of an accounting system entry and record a legal tender decomposition of the accounting system entry.

In some embodiments, the program instructions are further executable by the at least one processor to report the legal tender decomposition of the accounting system entry and the legal tender value of the accounting system entry.

In some embodiments, the program instructions are further executable by the at least one processor to calculate a composition value of the accounting system entry based at least in part on the legal tender decomposition of the accounting system entry.

In some embodiments, the program instructions are further executable by the at least one processor to calculate a composition value of the accounting system entry based at least in part on the legal tender decomposition of the accounting system entry, and the composition value is based at least in part on a material value of coins included in the legal tender decomposition.

In some embodiments, the program instructions are further executable by the at least one processor to calculate a dual-treatment aggregate value based in part on the legal the legal tender decomposition of the accounting system entry and the legal tender value of the accounting system entry.

In some embodiments, the program instructions are further executable by the at least one processor to calculate a composition value of the accounting system entry based at least in part on the legal tender decomposition of the accounting system entry. In some such embodiments, the program instructions are further executable by the at least one processor to calculate a comparison of the legal tender value of the accounting system entry and the composition value of the accounting system entry and report the legal tender value of accounting system entry, the composition value of the accounting system entry, and the comparison of the legal tender value of accounting system entry and the composition value of the accounting system entry.

In some embodiments, the program instructions are further executable by the at least one processor to calculate a transaction value based at least in part on the comparison of the legal tender value of accounting system entry and the composition value of the accounting system entry.

In some embodiments, the program instructions are further executable by the at least one processor to calculate a first composition value of the accounting system entry based at least in part on the legal tender decomposition of the accounting system entry. In some such embodiments, the first composition value is based at least in part on a metal composition of coins included in the legal tender decomposition and a metal price on a first date. In some embodiments, the program instructions are further executable by the at least one processor to calculate a second composition value of the accounting system entry based at least in part on the legal tender decomposition of the accounting system entry. In some such embodiments, the second composition value is based at least in part on a metal composition of coins included in the legal tender decomposition and a metal price on a second date. In some embodiments, the program instructions are further executable by the at least one processor to calculate a comparison of the first composition value and the second composition value and report the legal tender value of accounting system entry, the first composition value, the second composition value, and the comparison.

Some embodiments provide a non-transitory computer-readable storage medium storing program instructions. In some embodiments, the program instructions are computer-executable to implement recording a legal tender value of an accounting system entry and recording a legal tender decomposition of the accounting system entry.

In some embodiments the program instructions are further computer-executable to implement reporting the legal tender decomposition of the accounting system entry and the legal tender value of the decomposition.

In some embodiments the program instructions are further computer-executable to implement calculating a composition value of the accounting system entry based at least in part on the legal tender decomposition of the accounting system entry.

In some embodiments the program instructions are further computer-executable to implement calculating a composition value of the accounting system entry based at least in part on the legal tender decomposition of the accounting system entry. In some such embodiments, the composition value is based at least in part on a material value of coins included in the legal tender decomposition.

In some embodiments the program instructions are further computer-executable to implement calculating a composition value of the accounting system entry based at least in part on the legal tender decomposition of the accounting system entry. In some such embodiments, the program instructions are further computer-executable to implement calculating a comparison of the legal tender value of the accounting system entry and the composition value of the accounting system entry. In some such embodiments, the program instructions are further computer-executable to implement reporting the legal tender value of accounting system entry, the composition value of the accounting system entry, and the comparison of the legal tender value of accounting system entry and the composition value of the accounting system entry.

In some embodiments the program instructions are further computer-executable to implement calculating a transaction value based at least in part on the comparison of the legal tender value of accounting system entry and the composition value of the accounting system entry.

In some embodiments, one or more processors are employed to perform recording a legal tender value of an accounting system entry, recording a legal tender decomposition of the accounting system entry and preparing a proposed transaction report for a financial services transaction, wherein terms of a proposed transaction described in the proposed transaction report depend at least in part on the legal tender value and the legal tender decomposition.

In some embodiments, the preparing a proposed transaction report for a financial services transaction further includes calculating a composition value based in part on the legal tender decomposition, calculating a dual-treatment aggregate value based in part on the composition value, and based on the dual-treatment aggregate value, designating terms of the financial services transaction for use in the proposed transaction report.

In some embodiments, the preparing a proposed transaction report for a financial services transaction further includes calculating a composition value based in part on the legal tender decomposition, calculating a dual-treatment aggregate value based in part on the composition value, and based on the dual-treatment aggregate value, designating terms of the financial services transaction for use in the proposed transaction report. In some such embodiments, the terms of the financial services transaction include a loan secured by one or more coins represented by the legal tender decomposition of the accounting system entry.

In some embodiments, the preparing a proposed transaction report for a financial services transaction further includes calculating a composition value based in part on the legal tender decomposition, calculating a dual-treatment aggregate value based in part on the composition value, and based on the dual-treatment aggregate value, designating terms of the financial services transaction for use in the proposed transaction report. In some such embodiments, the terms of the financial services transaction include a proposed sale of one or more coins represented by the legal tender decomposition of the accounting system entry.

In some embodiments, the preparing a proposed transaction report for a financial services transaction further includes calculating a composition value based in part on the legal tender decomposition, calculating a dual-treatment aggregate value based in part on the composition value, and based on the dual-treatment aggregate value, designating terms of the financial services transaction for use in the proposed transaction report. In some such embodiments, the terms of the financial services transaction include a futures contract based at least in part on the legal tender decomposition of the accounting system entry.

In some embodiments, the preparing a proposed transaction report for a financial services transaction further includes calculating a composition value based in part on the legal tender decomposition, calculating a dual-treatment aggregate value based in part on the composition value, and based on the dual-treatment aggregate value, designating terms of the financial services transaction for use in the proposed transaction report. In some such embodiments, the terms of the financial services transaction include an option contract based at least in part on the legal tender decomposition of the accounting system entry.

In some embodiments, the preparing a proposed transaction report for a financial services transaction further includes calculating a composition value based in part on the legal tender decomposition, calculating a dual-treatment aggregate value based in part on the composition value, and based on the dual-treatment aggregate value, designating terms of the financial services transaction for use in the proposed transaction report. In some such embodiments, the terms of the financial services transaction include tax payments based at least in part on the legal tender decomposition of the accounting system entry.

In some embodiments, the preparing a proposed transaction report for a financial services transaction further includes calculating a composition value based in part on the legal tender decomposition, calculating a dual-treatment aggregate value based in part on the composition value, and based on the dual-treatment aggregate value, designating terms of the financial services transaction for use in the proposed transaction report. In some such embodiments, the terms of the financial services transaction include a series of advance payments based at least in part on the legal tender decomposition of the accounting system entry.

In some embodiments, the preparing a proposed transaction report for a financial services transaction further includes calculating a composition value based in part on the legal tender decomposition, calculating a dual-treatment aggregate value based in part on the composition value, and based on the dual-treatment aggregate value, designating terms of the financial services transaction for use in the proposed transaction report. In some such embodiments, the terms of the financial services transaction include payment terms modeled on predicted fluctuations of the composition value in response to changes in a spot price of one or more precious metals.

In some embodiments, the preparing a proposed transaction report for a financial services transaction further includes based on the dual-treatment aggregate value, designating terms of the financial services transaction for use in the proposed transaction report, wherein the terms of the financial services transaction include a loan secured by collateral comprising one or more coins represented by the legal tender decomposition of the accounting system entry, wherein terms of the loan are based at least in part on one or more futures contracts for determining the composition value of the accounting system entry.

In some embodiments, the preparing a proposed transaction report for a financial services transaction further includes based on the dual-treatment aggregate value, designating terms of the financial services transaction for use in the proposed transaction report, wherein the terms of the financial services transaction include a loan secured by collateral comprising one or more coins represented by the legal tender decomposition of the accounting system entry, wherein terms of the loan are based at least in part on one or more futures contracts for determining the composition value of the accounting system entry.

In some embodiments, one or more processors are employed to perform defining collateral for a financial transaction, assessing a valuation of the collateral based upon a difference between a material value and a legal tender value of the legal tender precious metal coins, and determining terms of the financial transaction based on the valuation. In some embodiments the collateral comprises one or more legal tender precious metal coins. In some embodiments, the one or more processors are employed to perform executing payments based on the terms of the financial transaction.

In some embodiments, the determining the terms of the financial transaction further includes determining terms of a loan based upon the valuation. In some embodiments, the determining the terms of the financial transaction further includes determining terms of the financial transaction based on a dual treatment aggregate value of the collateral. In some embodiments, the determining the terms of the financial transaction further includes determining valuations of one or more futures contracts. In some embodiments, the determining the terms of the financial transaction further includes determining valuation of a present payment for an agreed future transfer of the collateral based on an agreed future value of the collateral. In some embodiments, the determining the terms of the financial transaction further includes determining terms of a line of credit based upon the valuation. In some embodiments, the determining the terms of the financial transaction further includes determining terms of a payment annuity based upon the valuation. In some embodiments, the determining the terms of the financial transaction further includes determining terms of an insurance contract based upon the valuation. In some embodiments, the determining the terms of the financial transaction further includes determining terms of a purchase transaction based upon the valuation.

Some embodiments provide a system including at least one processor and a memory comprising program instructions. In some embodiments, the program instructions are executable by the at least one processor to define collateral for a financial transaction, assess a valuation of the collateral based upon a difference between a material value and a legal tender value of the legal tender precious metal coins, and determine terms of the financial transaction based on the valuation. In some embodiments, the collateral comprises one or more legal tender precious metal coins. In some embodiments, the program instructions are further executable by the at least one processor to execute payments based on the terms of the financial transaction.

In some embodiments, the program instructions executable by the at least one processor to determine the terms of the financial transaction further include program instructions executable by the at least one processor to determine terms of a loan based upon the valuation. In some embodiments, the program instructions executable by the at least one processor to determine the terms of the financial transaction further include program instructions executable by the at least one processor to determine terms of the financial transaction based on a dual treatment aggregate value of the collateral. In some embodiments, the program instructions executable by the at least one processor to determine the terms of the financial transaction further include program instructions executable by the at least one processor to determine valuations of one or more futures contracts. In some embodiments, the program instructions executable by the at least one processor to determine the terms of the financial transaction further include program instructions executable by the at least one processor to determine valuation of a present payment for an agreed future transfer of the collateral based on an agreed future value of the collateral.

In some embodiments, the program instructions executable by the at least one processor to determine the terms of the financial transaction further include program instructions executable by the at least one processor to determine terms of a line of credit based upon the valuation. In some embodiments, the program instructions executable by the at least one processor to determine the terms of the financial transaction further include program instructions executable by the at least one processor to determine terms of a payment annuity based upon the valuation. In some embodiments, the program instructions executable by the at least one processor to determine the terms of the financial transaction further include program instructions executable by the at least one processor to determine terms of an insurance contract based upon the valuation. In some embodiments, the program instructions executable by the at least one processor to determine the terms of the financial transaction further include program instructions executable by the at least one processor to determine terms of a purchase transaction based upon the valuation.

Some embodiments provide a non-transitory computer-readable storage medium storing program instructions. In some embodiments, the program instructions are computer-executable to implement defining collateral for a financial transaction, wherein the collateral comprises one or more legal tender precious metal coins, assessing a valuation of the collateral based upon a difference between a material value and a legal tender value of the legal tender precious metal coins, and determining terms of the financial transaction based on the valuation. In some embodiments, the program instructions are computer-executable to implement executing payments based on the terms of the financial transaction.

In some embodiments, the program instructions computer-executable to implement determining the terms of the financial transaction further include program instructions computer-executable to implement determining terms of a loan based upon the valuation. In some embodiments, the program instructions computer-executable to implement determining the terms of the financial transaction further include program instructions computer-executable to implement determining terms of the financial transaction based on a dual treatment aggregate value of the collateral. In some embodiments, the program instructions computer-executable to implement determining the terms of the financial transaction further include program instructions computer-executable to implement determining valuations of one or more futures contracts. In some embodiments, the program instructions computer-executable to implement determining the terms of the financial transaction further include program instructions computer-executable to implement determining valuation of a present payment for an agreed future transfer of the collateral based on an agreed future value of the collateral.

In some embodiments, the program instructions computer-executable to implement determining the terms of the financial transaction further include program instructions computer-executable to implement determining terms of a line of credit based upon the valuation. In some embodiments, the program instructions computer-executable to implement determining the terms of the financial transaction further include program instructions computer-executable to implement determining terms of a payment annuity based upon the valuation. In some embodiments, the program instructions computer-executable to implement determining the terms of the financial transaction further include program instructions computer-executable to implement determining terms of an insurance contract based upon the valuation. In some embodiments, the program instructions computer-executable to implement determining the terms of the financial transaction further include program instructions computer-executable to implement determining terms of a purchase transaction based upon the valuation.

BRIEF DESCRIPTION OF THE DRAWINGS

FIG. 11 depicts one embodiment of a graphical user interface for recording decomposition of accounting system entries.

FIG. 12B is a high-level logical flowchart of operations that can be used for preparing proposed transaction reports in support of financial services transactions based at least in part on decomposition of accounting system entries, according to some embodiments.

Figure 1:
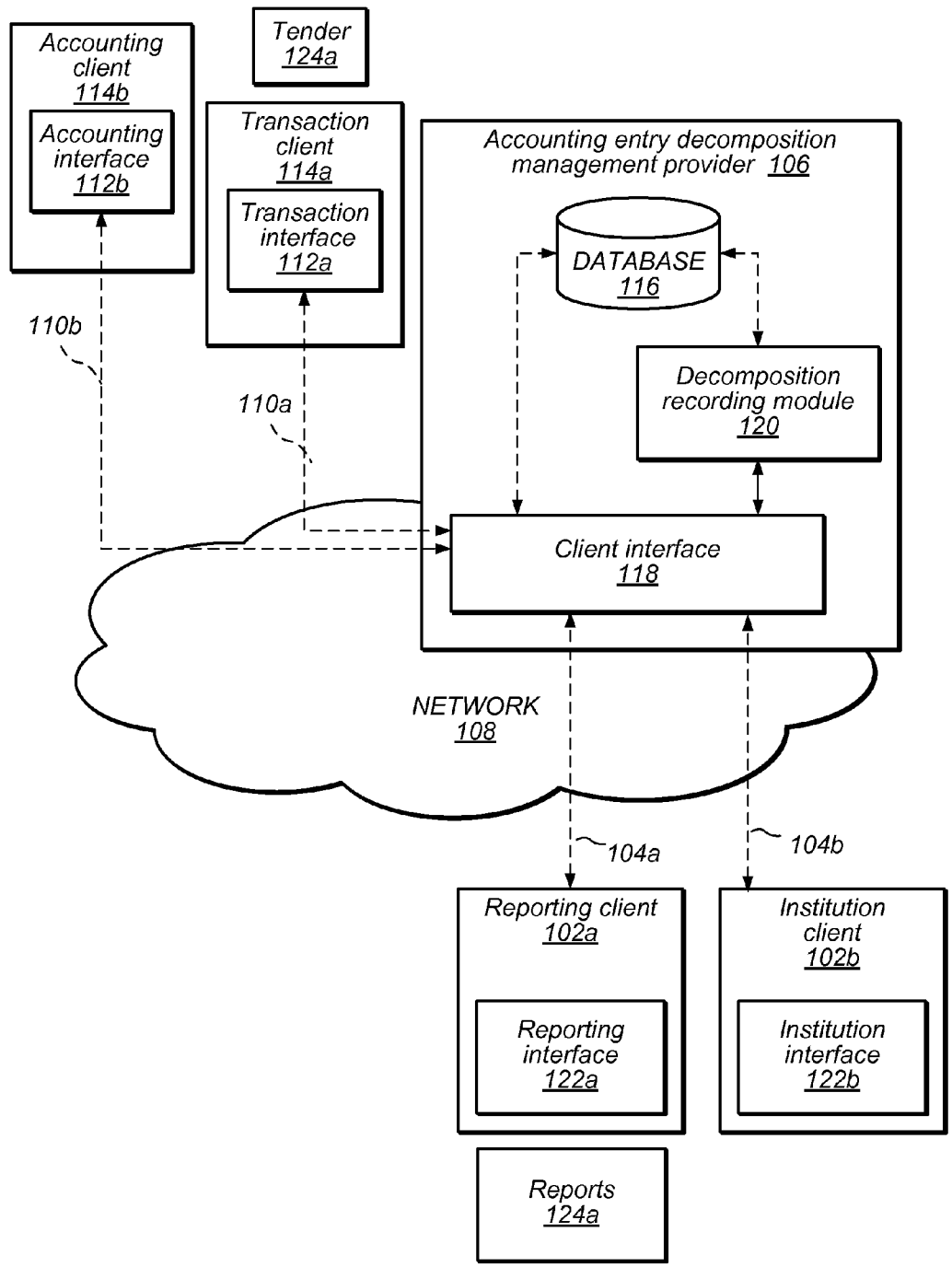
FIG. 1 illustrates a system architecture for recording decomposition of accounting system entries, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of methods and apparatus for recording decomposition of accounting system entries are disclosed. In one embodiment, one or more processors are employed to perform recording a legal tender value of an accounting system entry in a currency and recording a legal tender decomposition of the accounting system entry in the currency.

As used herein, "legal tender decomposition" refers to an array of data values (elements) representing identities of coins and/or bank notes of which a payment of an accounting system entry is, will be, was, or theoretically is composed. In some embodiments, legal tender values of decomposition elements (e.g., made up of federal reserve notes and/or legal tender precious metal coins) of a legal tender decomposition sum to a total value of an accounting system entry in a particular currency.

As used herein, "identity of a coin" refers to a notation of a type of coin sufficient to identify a legal tender value and design standard weight and composition of the coin. Examples of an identity of a coin include, generally a coin name descriptor, denomination, and year (e.g., specifically, a 1986 $50 United States Gold Eagle). Examples of an identity of a coin further include, generally, a composition and value (e.g., specifically a USD $50 91.67% Au 3% Ag 5.33% Cu at 1 oz). Examples of an identity of a coin additionally include, generally a coin name descriptor, condition, denomination, and year (e.g., specifically, a 1986 $50 United States Gold Eagle in BU).

As used herein, "identity of a bank note" refers to a descriptor of a bank note sufficient to identify a denomination and currency of the bank note. In some embodiments, an identity of a bank note identifies the currency, denomination and source of the bank note. For example, a bank note could be identified as "Greek $20 twenty-euro note 2010" or "German twenty-euro note."

As used herein, "federal reserve note" refers to a form of legal tender (e.g., system of identity of a bank note or coin) by which the legal tender value authorized by government is determined. At the time of this writing, the legal tender value of a federal reserve note controls valuation of the federal reserve note independent of composition value.

As used herein, "legal tender precious metal coins" refers to a form of legal tender (e.g., system of identity of a coin) by which the legal tender value authorized by government is determined, wherein there is a legal tender value distinct from any material value or composition value. More specifically, in some embodiments, there is a simultaneously different tax treatment for the legal tender value (i.e. ordinary income) vs. its material value, the tax treatment of which may be considered that of a collectible asset and therefore entitled to capital gains tax treatment.

As used herein, "legal tender value" refers to a value of a coin or bank note in a currency as set by government dependent on identity of the bank note or identity of the coin.

As used herein, "composition value" refers to a value of a coin dependent on a material value of a metal composition of a coin. In some embodiments, composition value depends on a date or location of transaction or may be uniformly agreed for purposes of a transaction or series of transactions.

As used herein, "dual-treatment aggregate value" refers to a value of a transaction based on composition value and variable tax treatment between a legal tender value and a composition value.

As used herein, "material value" refers to a value of a coin based on a current spot prices of the materials of which the coin is composed.

As used herein, a financial transaction is an event or condition under the contract between a buyer and a seller to exchange an asset for payment. A financial transaction represents a change in the status of the finances of two or more businesses or individuals, including but not limited to purchases, loans, mortgages, bank accounts, credit card transactions, debit card transactions.

As used herein, a valuation is a monetary value assigned to one or more items of collateral based on a set of assumptions.

Some embodiments include a system for recording decomposition of accounting system entries. In one embodiment, such a system may include a processor and a memory comprising program instructions. In some embodiments, the program instructions are executable by the at least one processor to record a legal tender value of an accounting system entry in a currency and record a legal tender decomposition of the accounting system entry in the currency.

Some embodiments may include a decomposition tracking module for recording decomposition of accounting system entries. The recording decomposition of accounting system entries may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform recording a legal tender value of an accounting system entry in a currency and recording a legal tender decomposition of the accounting system entry in the currency.

Example applications of embodiments vary from accounting and finance to law enforcement. In one embodiment, as described below, an accounting system entry includes a legal tender value of the accounting system entry and a legal tender decomposition of the accounting system entry. In some embodiments, the accounting system entry further includes a time stamp. Some embodiments perform the calculation of a composition value from the legal tender decomposition. Using the computation value calculated from the legal tender decomposition, some embodiments support tracking, management, and reporting of financial transactions such as loans, option agreements, hedge contracts, futures contracts, and/or payments timed to maximize transaction value and/or minimize taxation using conversion between legal tender value and payments based on time-variable composition value.

Application of Embodiments to Support for Financial Transaction

Some embodiments of systems and methods for recording decomposition of accounting system entries are usable for supporting transactions in which the value of the transaction is based, at least in part, on the legal tender decomposition of coins used to provide payment.

Over the last thirty years, Congress has exercised its power under Article I, Section 8, Clause 5 of the United States Constitution by instructing the US Mint to produce precious metal (e.g., gold, silver, platinum, palladium, etc.) coins as legal tender. These coins have a legal tender value set by Congress that is distinct and, at market prices prevailing at the time of this filing, much lower than the material value of the precious metal content that makes up the coins. Despite the fact that these coins have a "face value" (i.e., legal tender value) that is much lower than their material value (i.e., the value of the precious metals that make up the coins), the law is clear that the monetary value of the coins is their legal tender value.

Legal tender is legally defined in 31 U.S.C. §5103, which states that United States coins and currency (including Federal reserve notes and circulating notes of Federal reserve banks and national banks) are legal tender for all debts, public charges, taxes, and dues. Foreign gold or silver coins are not legal tender for debts. The monetary value of these coins is distinct from their material value. For example, the case of Ling Su Fan v. United States (218 U.S. 302 (1910)) is read to establish the legal distinction of a coin bearing the "impress" of the sovereign, asserting that public law gives to such coinage a value which does not attach as a mere consequence of intrinsic value. Their quality as a legal tender is an attribute of law aside from their bullion value. They bear, therefore, the impress of sovereign power which fixes value and authorizes their use in exchange. The case of Thompson v. Butler (95 U.S. 694, 696 (1877)) is read to establish that the law makes no legal distinction between the values of coin and paper money used as legal tender, stating that a " coin dollar is worth no more for the purposes of tender in payment of an ordinary debt than a note dollar. The law has not made the note a standard of value any more than coin. It is true that in the market, as an article of merchandise, one is of greater value than the other; but as money, that is to say, as a medium of exchange, the law knows no difference between them."

As recently as 2008, the courts have affirmed this distinction between legal tender value and material value. In Crummey v. Klein Independent School District, the Fifth Circuit Court of Appeals heard a case in which Brent E. Crummey brought a lawsuit complaining that two employees of the KISD tax office declined to accept Crummey's fifty-dollar United States American Eagle gold coins for any more than the face value of the coins in Federal Reserve Note dollars as tender in payment for taxes Crummey owed. The Fifth Circuit stated that, "[r]egardless of any currency confusion that may have arisen in bygone eras, our present standard is clear: As legal tender, a dollar is a dollar." They further stated that: "As legal tender, a dollar is a dollar, regardless of the physical embodiment of the currency."

The Internal Revenue Service (IRS) has held that while these coins have a legal tender value, for tax purposes legal tender precious metal coins are considered a collectible item. If they are held for more than one year and then sold, any profits (from any changes in the value of the precious metals) are taxed at a 28% collectibles capital gains tax rate. If they are held less than one year and then sold, any profits are taxed as ordinary income.

The IRS has also advised people that if a US Mint gold coin is used as legal tender (utilizing its face value) and then is later sold for its precious metal value, capital gains taxes (at the collectible rate) would be owed based upon the difference between the sales price minus the basis, which would be the face value of the coin.

Some embodiments support transactions, in which individuals may seek to legally reduce the taxes they pay in some transactions by recording the decomposition of an accounting entry recording receipt of a payment for later use in calculating capital gains taxation on the sale of metal coins which were received as the original payment. Such embodiments provide support for accounting useful in taking advantage of the fact that a US Mint precious metal coin can be used for its face value in a first stage of a transaction (purchase or acquisition), and when the recipient later sells the coin for its precious metal value, the tax owed may be calculated at the collectible capital gains taxes on the difference between the face value and the sales price. These capital gains taxes could be significantly lower than the taxes that might have otherwise been owed had the transaction not occurred with a US Mint precious metal coin. As used herein, a transaction in which capital gains tax treatment with respect to the difference between the composition value and the legal tender value of a coin is reported is an embodiment of a "dual-treatment aggregate value" transaction.

Some embodiments for recording the decomposition of an accounting entry support transactions for enabling some forms of taxed transactions (e.g. estate, income, inheritance, gift, etc.) to enjoy treatment at lower tax rate (e.g., capital gains rate) by using US Mint precious metal coins as a vehicle for splitting the taxes into two categories—the original tax category based upon the legal tender value of the US Mint precious metal coins (e.g. estate taxes, income taxes, inheritance taxes, gift taxes, etc.) and capital gains taxes at the collectible capital gains tax rate to achieve a "dual-treatment aggregate value" transaction.

As an example of a transaction supported by some embodiments for recording the decomposition of an accounting entry, consider an example of a parent seeking to give a child a cash gift. There is a currently gift tax exemption of $13,000 per year. A parent could give the child 260 one-ounce $50 American Gold Eagle coins with a face value of $13,000, recording an accounting system entry containing both a legal tender value of the accounting system entry ($13,000) and a legal tender decomposition of the accounting system entry (260 one-ounce $50 American Gold Eagle coins). Assuming the child holds the coins for more than one year, which some embodiments support by recording dates of transactions, and then sells them at $1,000 per ounce, the child would realize a capital gain of $247,000 ($260,000 minus the $13,000 basis). The child would owe a collectible capital gains tax of 28% of the $247,000 gained—but that amount would be significantly less then the ordinary income tax rate the child would have had to have paid on the $247,000 had it been given directly to the child as income. Some embodiments for recording the decomposition of an accounting entry support management of a transaction similar to this example. Additionally, some embodiments support financial transactions that allow for pre-payment of transaction cash flows by an institution holding coins for a party to such a transaction.

As an example of another transaction supported by some embodiments for recording the decomposition of an accounting entry, consider an example of an individual who may wish to reduce the 55% estate tax (or "death tax") that they would pay when passing an estate of $60 million on to their heirs. Assume that the market price of gold is $1000/oz. By purchasing 60,000 one-ounce $50 American Gold Eagle coins with a face value of $3 million, the estate would transfer to the heirs without paying the 55% estate tax which exempts the first $3 million transferred. If the heirs held the 60,000 coins for at least one year and then sold them at $1,000 per ounce, they would owe a 28% tax on the $57 million in capital gains that was made, thus saving 27% taxes on the original $60 million estate (a tax savings of $16.2 million). Some embodiments for recording the decomposition of an accounting entry support management of a transaction similar to this example.

In some embodiments, accounting system entries are tracked in order to record the dates of transactions, the amount of the transactions in dollars (legal tender value) and the legal tender decomposition in US Mint precious metal coins. Some embodiments additionally record or are designed to query from a database the spot price of the precious metals at the date and time of any transactions, such that the number and type of US Mint precious metal coins can be used to calculate the taxes owed. Some embodiments further facilitate collections, payment, and reporting to taxing authorities, as well as loans, derivative contracts, futures contracts, option agreements, secured transactions, and payment streams tied to the legal tender decompositions of accounting entries.

Notes with Respect to the Discussion of Embodiments

In the detailed description included herein, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Example Implementations

FIG. 1 illustrates a system architecture for recording decomposition of accounting system entries, according to some embodiments. In some embodiments, an accounting entry decomposition management provider 106 performs functions for tracking, managing and reporting transactions in which transaction value is based, at least in part, on recorded legal tender decompositions of accounting entries in a currency, as described herein. In some embodiments, a decomposition recording module 120 executes instructions for recording a legal tender value of an accounting system entry and recording a legal tender decomposition of the accounting system entry. Additionally, in some embodiments, a client interface 118 is used for receiving accounting entry data and reporting the legal tender decomposition of the accounting system entry and the legal tender value of the decomposition, such as over a network 108.

In some embodiments, the accounting entry data includes data 104b received over client interface 118 from institution client 102b, such as terms and conditions of transactions (e.g., loans, payments, cash advances, credit cards, article 9 secured transactions on gold in an inventory, lines of credit, article 3 credit instruments, or debit transactions), supported using accounting system entries including both a legal tender value of the accounting system entry and a legal tender decomposition of the accounting system entry. In some embodiments, the accounting entry data includes data 104b that is received using an institution interface 122b such as a teller's data entry screen or an account manager's data entry screen in the offices of a financial institution (e.g., bank, brokerage house, credit union).

In some embodiments, client interface 118 is used for providing accounting system entries for reports or reporting the legal tender decomposition of the accounting system entry and the legal tender value of the decomposition, such as over a network 108. In some embodiments, the report data includes data 104a is sent over client interface 118 to reporting client 102a, such as accounting entries representing aspects of transactions (e.g., values of loans, payments, cash advances, credit cards, article 9 secured transactions on gold in an inventory, lines of credit, article 3 credit instruments, or debit transactions), for use in reports 124*a* supported using accounting system entries including both a legal tender value of the accounting system entry and a legal tender decomposition of the accounting system entry. In some embodiments, such reports 124*a* include accounting system entries including both a legal tender value of the accounting system entry and a legal tender decomposition of the accounting system entry. In some embodiments, only legal tender values for transactions are reported in certain reports 124*a*. Likewise, in some embodiments, only legal tender decompositions are reported in certain reports 124*a*. Examples of such transactions are discussed herein. In some embodiments, the reporting data includes data 104*a* that is reported over a reporting interface 122*a* such as a teller's data entry screen or an account manager's data entry screen in the offices of a financial institution (e.g., bank, brokerage house, credit union). In other embodiments, reporting client data includes data 104*a* that is reported over a reporting interface 122*a* such as a web client on an end user interface. In some embodiments, reports 124*a* are screen displays or audio provided to a user. In other embodiments, reports 124*a* are printed paper statements and receipts.

In some embodiments, institution client 102*b* is a system for interacting with accounting entry decomposition management provider 106 that is used by recipients and providers of payments described in accounting system entries including a legal tender value of the accounting system entry and a legal tender decomposition of the accounting system entry.

In some embodiments, institution client 102*b* is a system for interacting with accounting entry decomposition management provider 106 that is used by precious metal tender warehouses for handling transactions described in accounting system entries including a legal tender value of the accounting system entry and a legal tender decomposition of the accounting system entry.

In some embodiments, institution client 102*a* and reporting client 102*b* are systems for professional services companies involved in facilitating accounting reporting, tax calculation, and/or transaction reporting to users of transactions supported by an operator of accounting entry decomposition management provider 106.

In some embodiments, a transaction client 114*a* is a system for receiving or dispensing tender, such as an automatic teller (ATM) machine, represented by accounting system entries including a legal tender decomposition of the accounting system entry, and, optionally, a legal tender value of the accounting system entry. In some embodiments, data 110*a* containing accounting system entries including a legal tender decomposition of the accounting system entry is forwarded as data 104*a*-104*b* to accounting entry decomposition management provider 106 and then to reporting client 102*a* for reporting of the legal tender decomposition of the accounting system entry and the legal tender value of the decomposition. In some embodiments, data 110*a* represents payments received as tender 126*a* comprising both bank notes and legal tender precious metal coins. In some embodiments, a transaction interface 112*a* is provided for allowing a user to provide details of the transaction. In some embodiments, transaction client 114*a* is able to analyze tender 124*a* to determine the legal tender decomposition of tender 124*a*.

In some embodiments, data 110*a* may include accounting reports of various aspects of accounting system entries including a legal tender decomposition of the accounting system entry, and, optionally, a legal tender value of the accounting system entry. In some embodiments, an amount of a current payment received or requested as tender 124*a* is based at least in part upon accounting system entries including a legal tender decomposition of the accounting system entry, and, optionally, a legal tender value of the accounting system entry. Various data 110*a*-110*b* and data 104*a*-104*b* may be stored in a database 116 for tracking, managing and reporting transactions based at least in part upon accounting system entries including a legal tender decomposition of the accounting system entry, and, optionally, a legal tender value of the accounting system entry.

In some embodiments, an accounting client 114*b* is a system for interacting with accounting entry decomposition management provider 106 that is used by end users of with accounting entry decomposition management provider 106 to record a legal tender decomposition of the accounting system entry, and record a legal tender value of the accounting system entry. In some embodiments, data 110*b* containing a legal tender decomposition of the accounting system entry and a legal tender value of the accounting system entry may be forwarded to reporting client 102*a* as data 104*a* for reporting or to institution client 102*b* to indicate an order for a financial transaction, thereby facilitating payment or transaction processing. In some embodiments, data 110*b* may include accounting reports of various aspects of transactions including a legal tender decomposition of an accounting system entry and a legal tender value of the accounting system entry.

An example of one embodiment of a transaction supported as described herein follows. A user of a transaction client 114*a* may approach transaction client 114*a* and submit tender 124*a* for deposit in an account managed by a financial institution using accounting entry decomposition management provider 106. Accounting system entries are transmitted to client interface 118*a* over network 108*a* as data 110*a*. Accounting entry decomposition management provider 106 records to database 116 a legal tender decomposition of an accounting system entry and a legal tender value of the accounting system entry, where the entry represents tender 124*a*. Accounting entry decomposition management provider 106 reports a legal tender decomposition of the accounting system entry and the legal tender value of the accounting system entry as data 104*b* to institution client 102*b* for use with institution interface 122*b* at a financial institution, such as a bank, that supports precious metal banking accounts. Accounting entry decomposition management provider 106 reports a legal tender decomposition of the accounting system entry and the legal tender value of the accounting system entry as data 104*a* to reporting client 102*a* for use with reporting interface 122*a* at a professional services provider, such as an accountancy, for preparing tax reports based on the legal tender decomposition of the accounting system entry and the legal tender value of the accounting system entry.

Accounting entry decomposition management provider 106 reports a legal tender decomposition of the accounting system entry and the legal tender value of the accounting system entry as data 110*b* to accounting client 112*b* for use with accounting interface 122*a* at a user terminal, such as a business accounting software package, for preparing reports such as balance sheets and cash flow based on the legal tender decomposition of the accounting system entry and the legal tender value of the accounting system entry.

Figure 2:
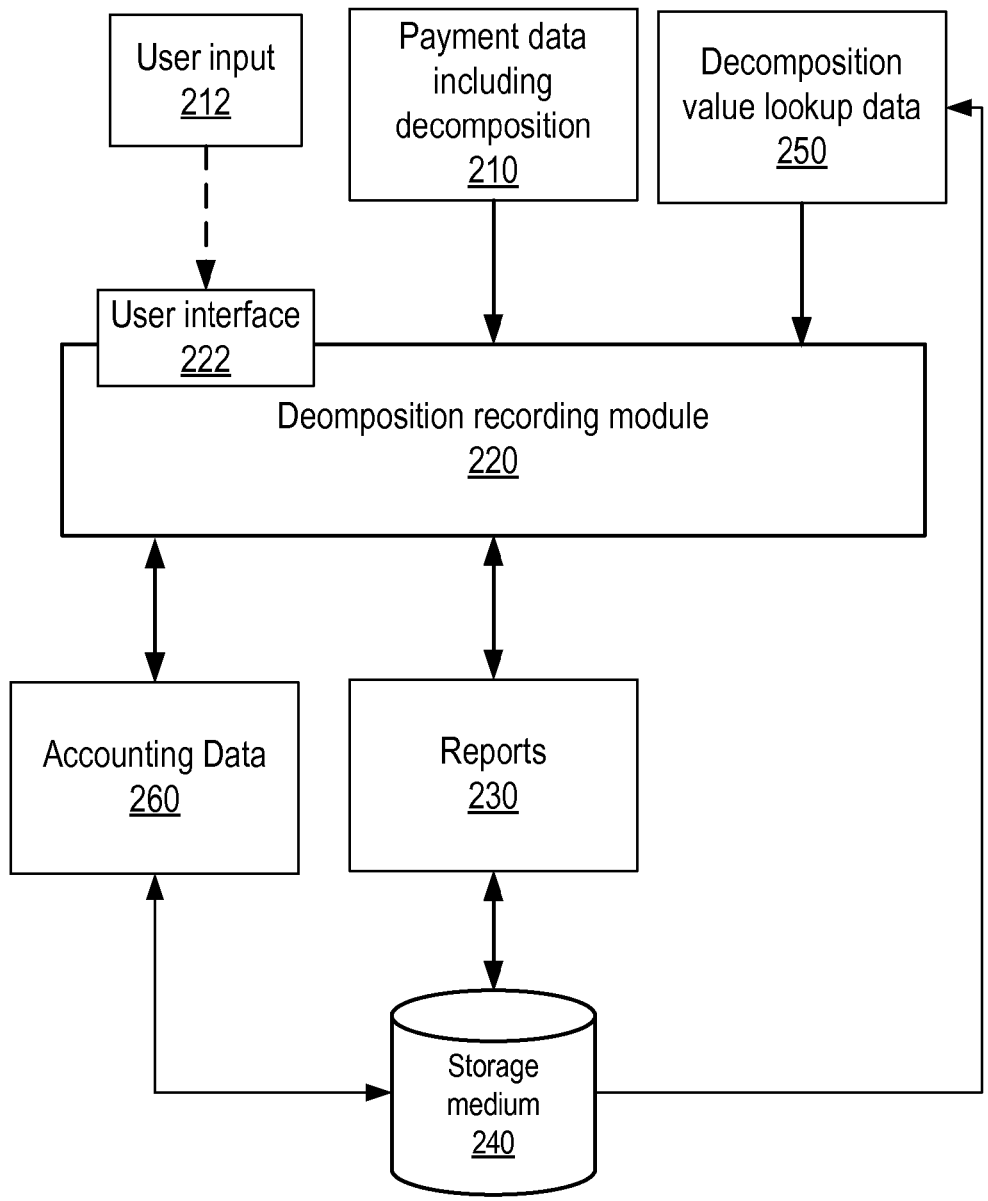
FIG. 2 depicts a module that that may be used for recording decomposition of accounting system entries, according to some embodiments.

FIG. 2 depicts a module that that may be used for recording decomposition of accounting system entries, according to some embodiments. A decomposition recording module 220 includes instructions for, in some embodiments, recording a legal tender value of an accounting system entry and recording a legal tender decomposition of the accounting system entry.

In some embodiments, decomposition recording module 220 implements one or more of a tool for calculating a composition value of the accounting system entry based at least in part on the legal tender decomposition of the accounting system entry or a tool for reporting the legal tender decomposition of the accounting system entry and the legal tender value of the decomposition. In some embodiments, decomposition recording module 220 implements tools for retrieving decomposition lookup data 250 including, in some embodiments either or both of, the composition of coins and the spot values (at various dates) of metals of which coins are composed. In some embodiments, decomposition recording module 220 receives payment data including decompositions from an accounting client, institution client, or transaction client. FIG. 12 illustrates an example computer system on which embodiments of decomposition recording module 220 may be implemented.

In some embodiments, decomposition recording module 220 receives as input one or more items of payment data including decompositions 210. Payment data 210 varies between embodiments. Examples include but are not limited to up/downloaded transaction statements, up/downloaded financial statements from a financial services provider, imported banking and transaction data directly from one or more remote bank accounts or financial institutions that provide banking services through a transaction interface, and manually entered decomposition information from an accounting client. Embodiments support data intake ranging from manual entry to automatic integrated decomposition support from transaction clients that electromechanically ascertain the identity of a coin or bank note, either through direct measurement of the coin or bank note or through electro-optically reading the identity of a "slabbed coin" from its casing. In some embodiments, decomposition recording module 220 is integrated within an accounting provider or accounting package. In other embodiments, decomposition recording module 220 operates as a stand-alone application on any of a wide range of computing systems, examples of which include but are not limited to systems including ATM machines, mainframes, personal desktop computers, cloud computing environments, hand-held computers and smartphones.

In some embodiments, decomposition recording module 220 may receive user input 212 indicating decompositions, providing payment instructions, providing metal prices, indicating terms and conditions of a transaction, or requesting tracking reports for transactions. Decomposition recording module 220 calculates transaction values based on composition information, tax rates, dates and transaction terms, which may include agreed or spot metal prices. In some embodiments, decomposition recording module 220 also detects and reports suspicious or prohibited transactions. Decomposition recording module 220 may receive information indicating payments received or price fluctuations. Decomposition recording module 220 updates accounting data 260 and provides reports 230 reflecting the tracking, management and reporting transactions. Accounting data 260 and reports 230 may, for example, be stored to a storage medium 240, such as system memory, a disk drive, DVD, CD, etc.

In some embodiments, decomposition recording module 220 may provide a user interface 222 via which a user may interact with the decomposition recording module 220, for example to set up terms and conditions of a transaction, report legal tender values and legal tender decompositions of account entries, arrange payments, and request reports. In some embodiments, the user interface may provide user interface elements whereby the user may select options including, but not limited to, fixed metal prices and tax rate preferences, loan and payment terms, and orders for financial transactions.

Example Legal Tender Decompositions

Figures 3A, 3B, 3C:
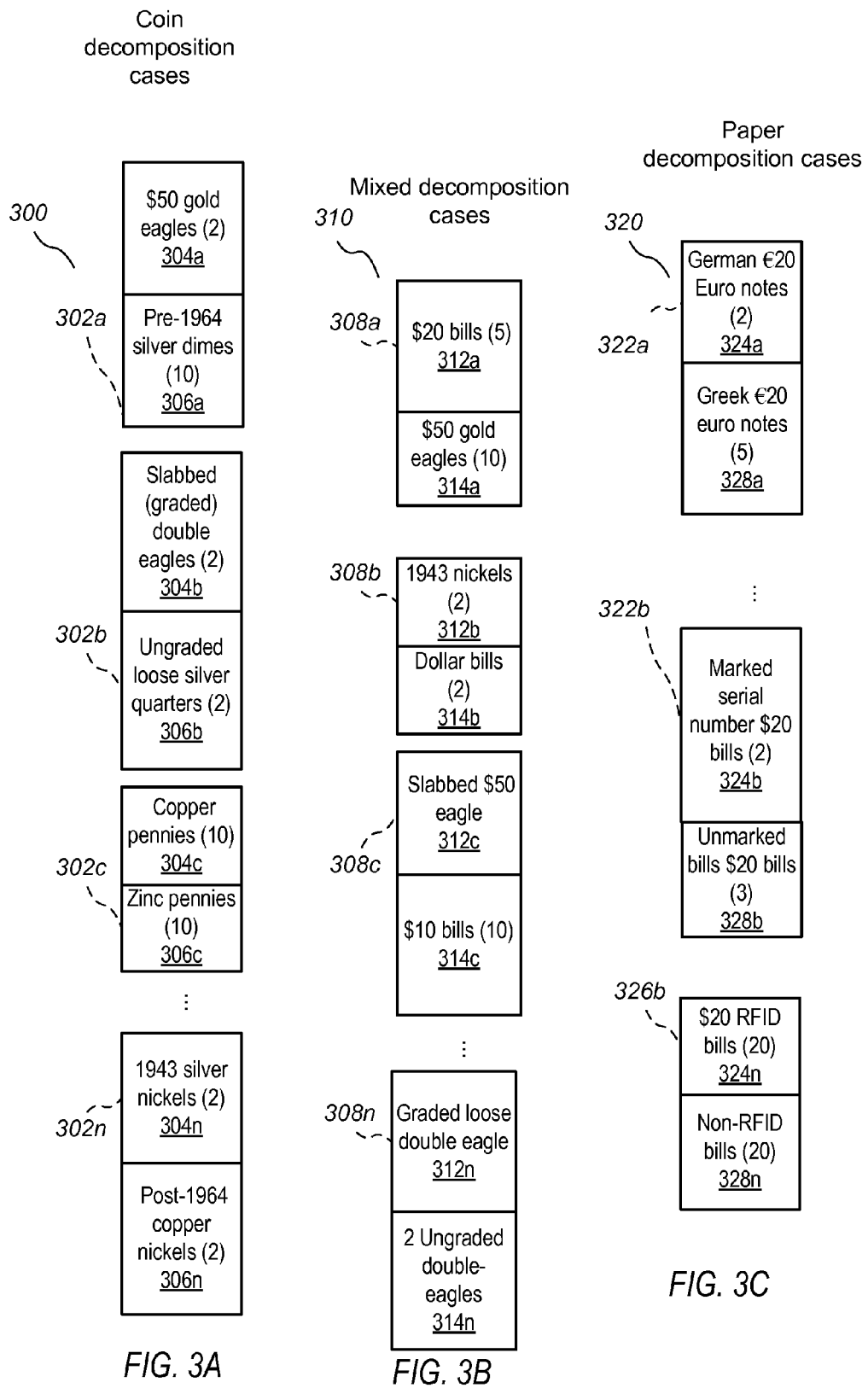
FIGS. 3A-3C illustrate a series of decompositions of accounting system entries that may be recorded, according to some embodiments.

FIGS. 3A-3C illustrate a series of decompositions of accounting system entries that may be recorded, according to some embodiments. A series of coin decomposition cases 300 is provided in FIG. 3A. In a first case 302a, a decomposition of two $50 gold eagles 304a and ten pre-1964 silver dimes is recorded along with a legal tender value of $101.00. In a second case 302b, a decomposition of two $20 slabbed (graded) double eagles 304b and two pre-1964 silver quarters is recorded along with a legal tender value of $40.50. In a third case 302c, a decomposition of ten $0.01 copper pennies 304c and ten zinc pennies is recorded along with a legal tender value of $00.40. In an nth case 304n, a decomposition of two 1943 silver nickels 304n and two post-1964 copper nickels is recorded along with a legal tender value of $00.20.

A series of mixed decomposition cases 310 is provided in FIG. 3B. In a first case 308a, a decomposition of five $20 US bills 312a and ten $50 gold eagles is recorded along with a legal tender value of $500.00. In a second case 308b, a decomposition of two 1943 nickels 312b and two dollar bills is recorded along with a legal tender value of $2.10. In a third case 308c, a decomposition of one slabbed $50 gold eagle 312c and ten $10 bills 314c is recorded along with a legal tender value of $150.00. In an nth case 304n, a decomposition of a graded loose double eagle 312n and two ungraded loose double eagles 314n is recorded along with a legal tender value of $80.00.

A series of bill decomposition cases 320 is provided in FIG. 3C. In a first case 322a, a decomposition of two €20 German notes 324a and five €20 Greek notes 328a is recorded along with a legal tender value of €120. In a second case 322b, a decomposition of two marked (serial number, and the serial numbers are recorded) $20 bills 324b and three unmarked $20 dollar bills is recorded along with a legal tender value of $100. In an nth case 308c, a decomposition of twenty RFIDed $20 bills 324n and twenty non-RFIDed $20 bills 328n is recorded along with a legal tender value of $800.00. RFIDs are also recorded.

Example Operations Usable by Some Embodiments

Figure 4:
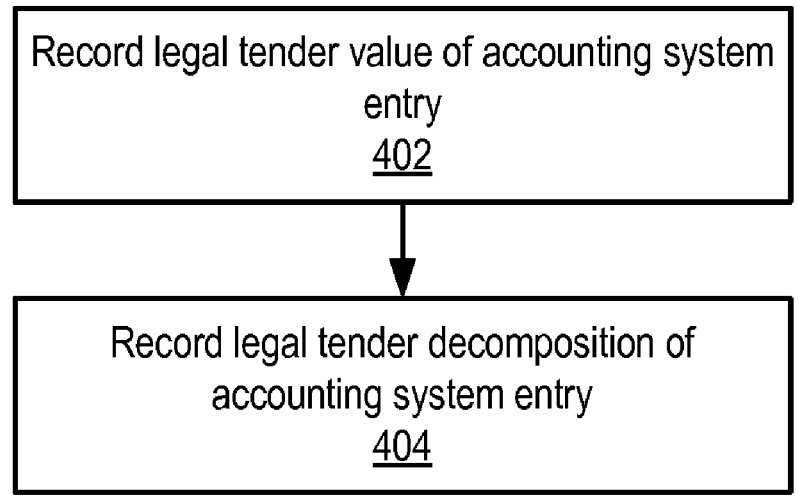
FIG. 4 is a high-level logical flowchart of operations usable for recording decomposition of accounting system entries, according to some embodiments.

FIG. 4 is a high-level logical flowchart of operations usable for recording decomposition of accounting system entries, according to some embodiments. A legal tender value of an accounting system entry is recorded (block 402). In some embodiments, the legal tender value is recorded in a currency. A legal tender decomposition of the accounting system entry is recorded (block 404). In some embodiments, the legal tender value is recorded in the currency.

Figure 5:
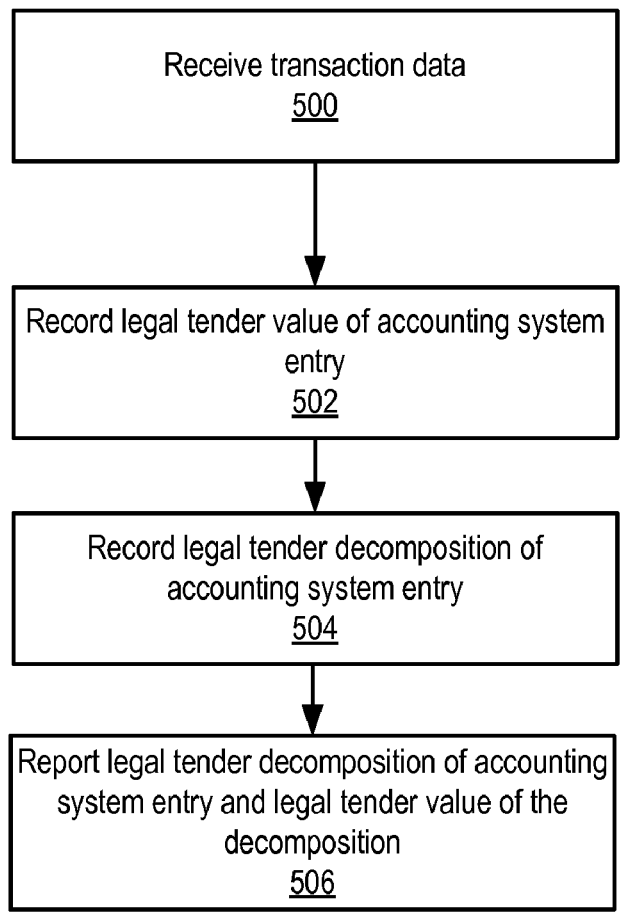
FIG. 5 is a high-level logical flowchart of operations that can be used for recording and reporting decomposition of accounting system entries, according to some embodiments.

FIG. 5 is a high-level logical flowchart of operations that can be used for recording and reporting decomposition of accounting system entries, according to some embodiments. Transaction data is received (block 500). A legal tender value of an accounting system entry is recorded (block 502). In some embodiments, the legal tender value is included in the received transaction data. A legal tender decomposition of the accounting system entry is recorded (block 504). A legal tender decomposition of accounting system entry and a legal tender value of the decomposition are reported (block 506).

Figure 6:
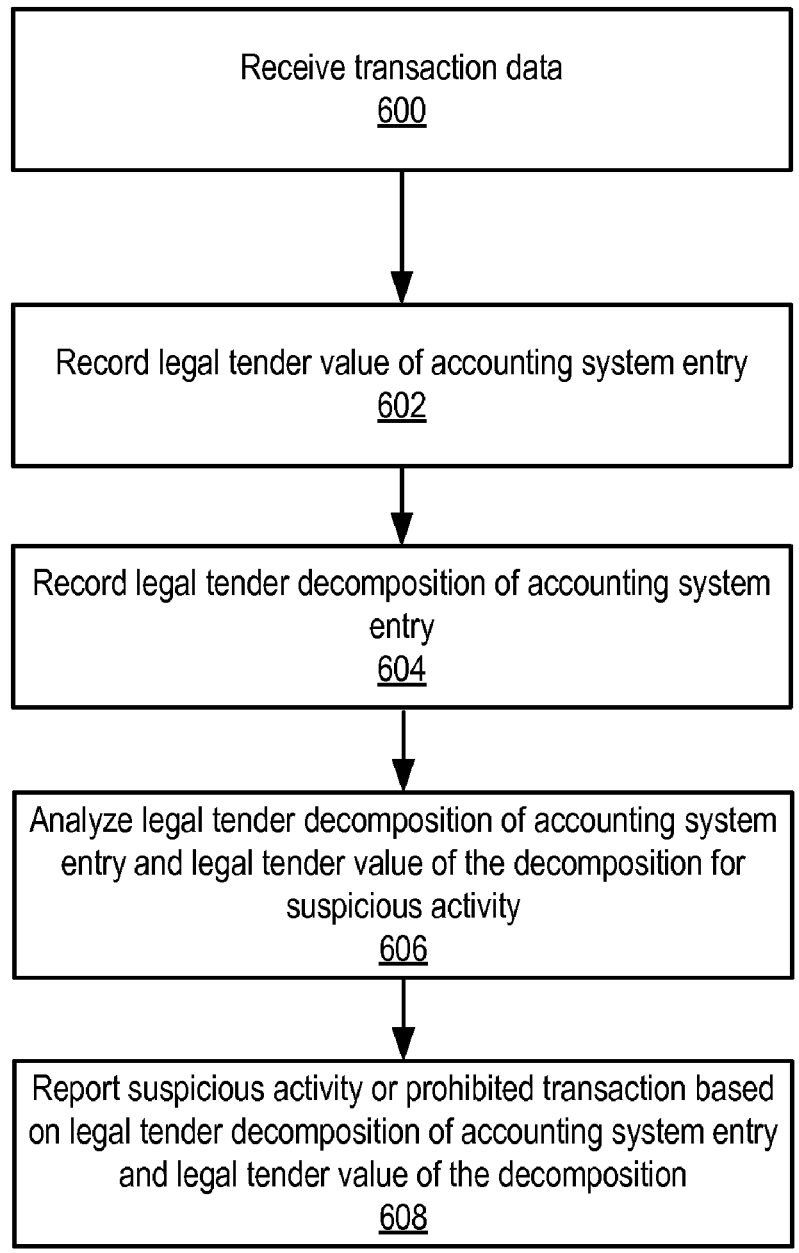
FIG. 6 is a high-level logical flowchart of operations that can be used for a law enforcement application of recording decomposition of accounting system entries, according to some embodiments.

FIG. 6 is a high-level logical flowchart of operations that can be used for a law enforcement application of recording decomposition of accounting system entries, according to some embodiments. Transaction data is received (block 600). A legal tender value of an accounting system entry is recorded (block 602). In some embodiments, the legal tender value is recorded in a currency. A legal tender decomposition of the accounting system entry is recorded (block 604). The legal tender decomposition of accounting system entry and legal tender value of the decomposition are analyzed for suspicious activity (block 606). Suspicious activity or a prohibited transaction based is reported on legal tender decomposition of accounting system entry and legal tender value of the decomposition (block 608).

Figure 7:
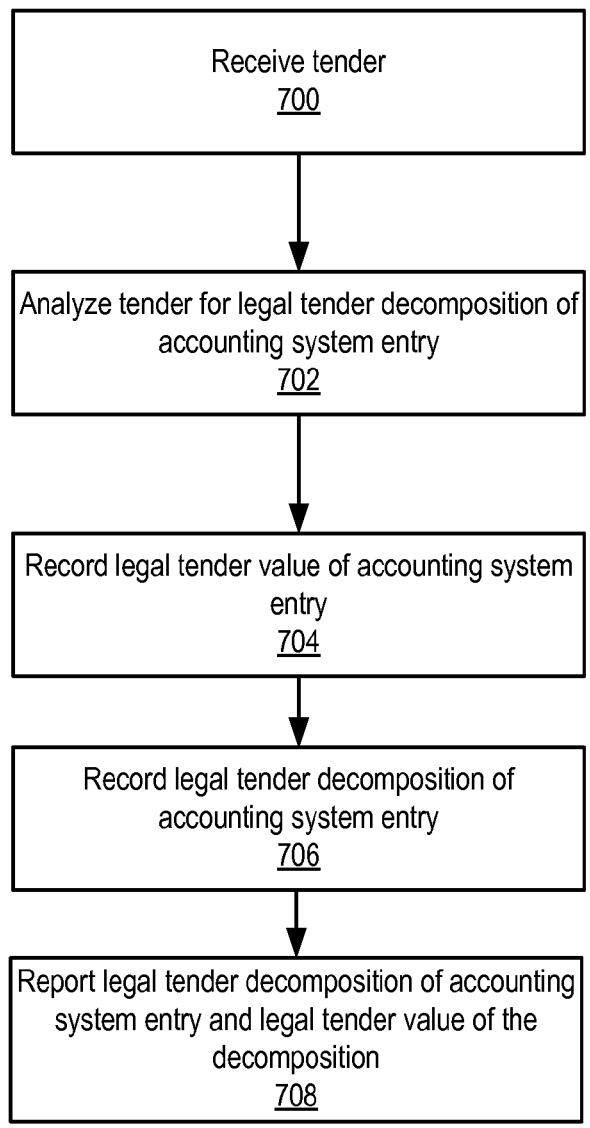
FIG. 7 is a high-level logical flowchart of operations that can be used for a fully mechanized recording of decomposition of accounting system entries, according to some embodiments.

FIG. 7 is a high-level logical flowchart of operations that can be used for a fully mechanized recording of decomposition of accounting system entries, according to some embodiments. Tender is received (block 700). In some embodiments, tender is received through a transaction client, examples of which include automated teller machines and other similar transaction terminals. The tender for is analyzed for legal tender decomposition of accounting system entry (block 702). In some embodiments, analysis can include electromechanical analysis of a coin to determine identify or composition (e.g., based on dimensions, weight, conductivity, electromagnetic signature, or other measurable characteristics). In other embodiments, analysis can include identifying coins or bank notes with electro-optic sensors and pattern recognition software. In some embodiments, coins may be received in holders (slabs) with identifying information provided on the coin. Likewise, banknotes may be analyzed electro-optically in some embodiments or through an radio-frequency identifier inserted within the banknote. Alternative embodiments substitute entry by a bank teller of the legal tender decomposition for the analysis operation.

Legal tender value of accounting system entry is recorded (block 704). Legal tender decomposition of the accounting system entry is recorded (block 706). Legal tender decomposition of accounting system entry and legal tender value of the decomposition are reported (block 708).

Figure 8:
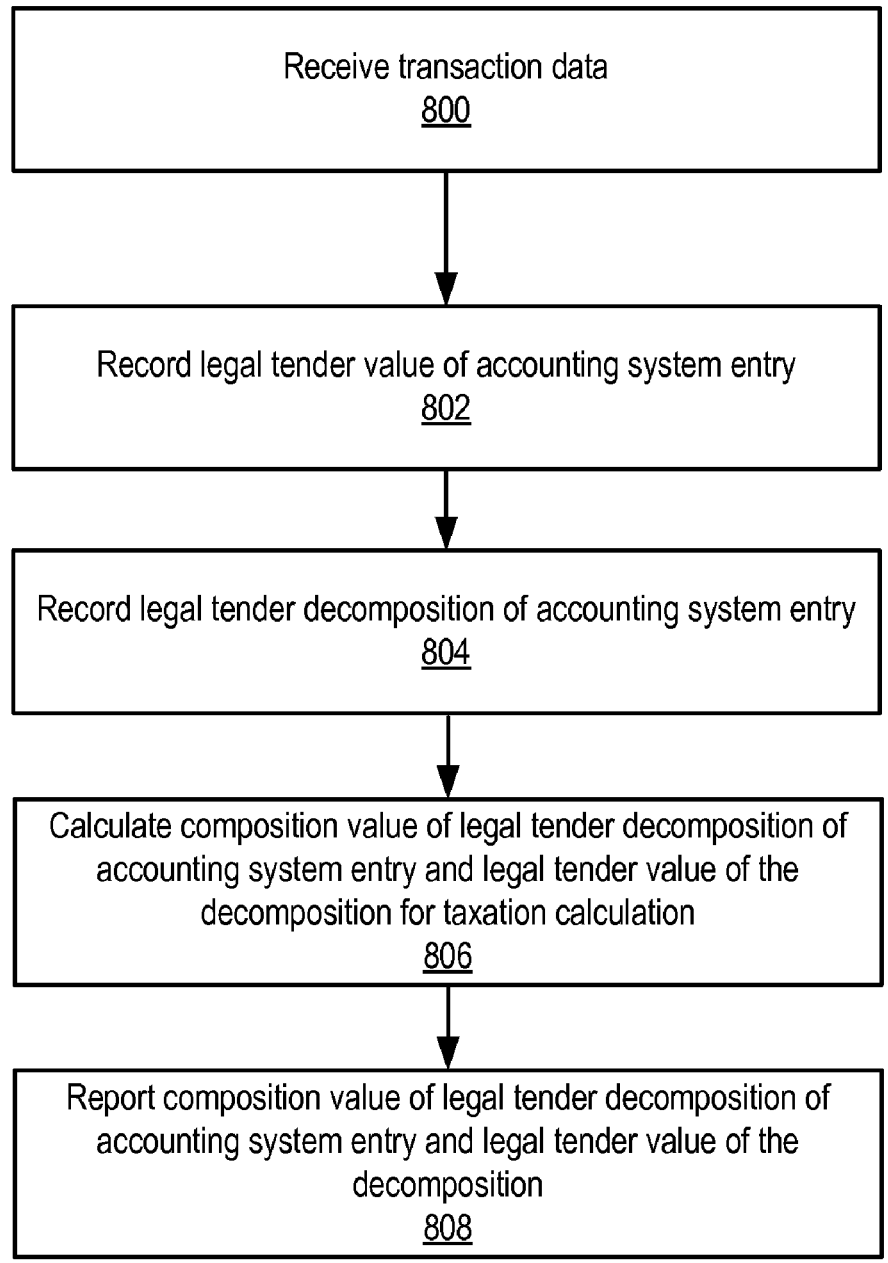
FIG. 8 is a high-level logical flowchart of operations that can be used for a recording of decomposition of accounting system entries with composition value computation, according to some embodiments.

FIG. 8 is a high-level logical flowchart of operations that can be used for a recording of decomposition of accounting system entries with composition value computation, according to some embodiments. Transaction data is received (block 800). Legal tender value of an accounting system entry is recorded (block 802). Legal tender decomposition of the accounting system entry is recorded (block 804). A composition value of the legal tender decomposition of accounting system entry and legal tender value of the decomposition is calculated for taxation calculation (block 806). The composition value of legal tender decomposition of accounting system entry and legal tender value of the decomposition are reported (block 808).

Figure 9A:
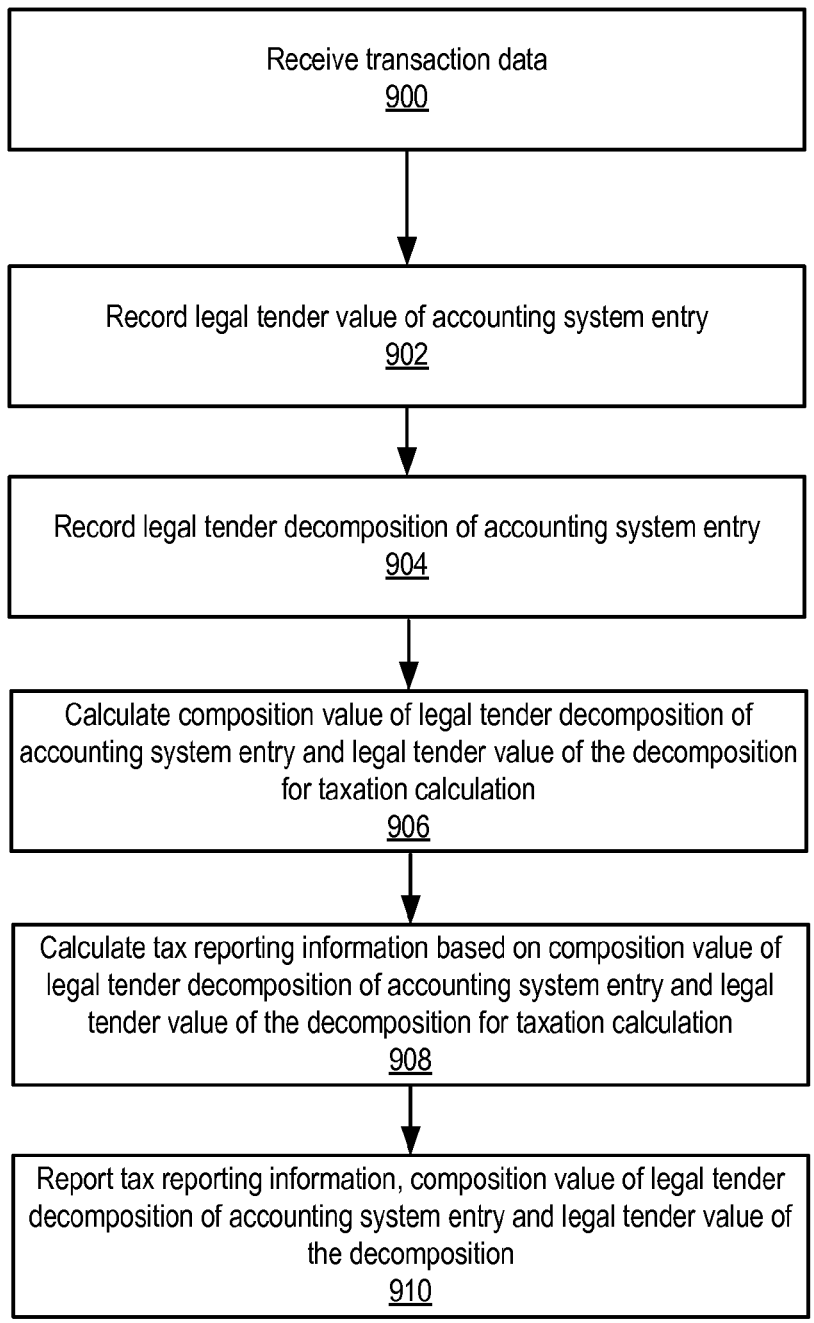
FIG. 9A is a high-level logical flowchart of operations that can be used for recording decomposition of accounting system entries with tax reporting, according to some embodiments.

FIG. 9A is a high-level logical flowchart of operations that can be used for a recording of decomposition of accounting system entries with tax reporting, according to some embodiments. Transaction data is received (block 900). Legal tender value of an accounting system entry is recorded (block 902). A legal tender decomposition of the accounting entry is recorded (block 904). A composition value of legal tender decomposition of accounting system entry and legal tender value of the decomposition for taxation calculation is calculated (block 906). Tax reporting information is calculated based on composition value of legal tender decomposition of accounting system entry and legal tender value of the decomposition for taxation calculation (block 908). Tax reporting information, composition value of legal tender decomposition of accounting system entry and legal tender value of the decomposition are reported (block 910).

Figure 9B:
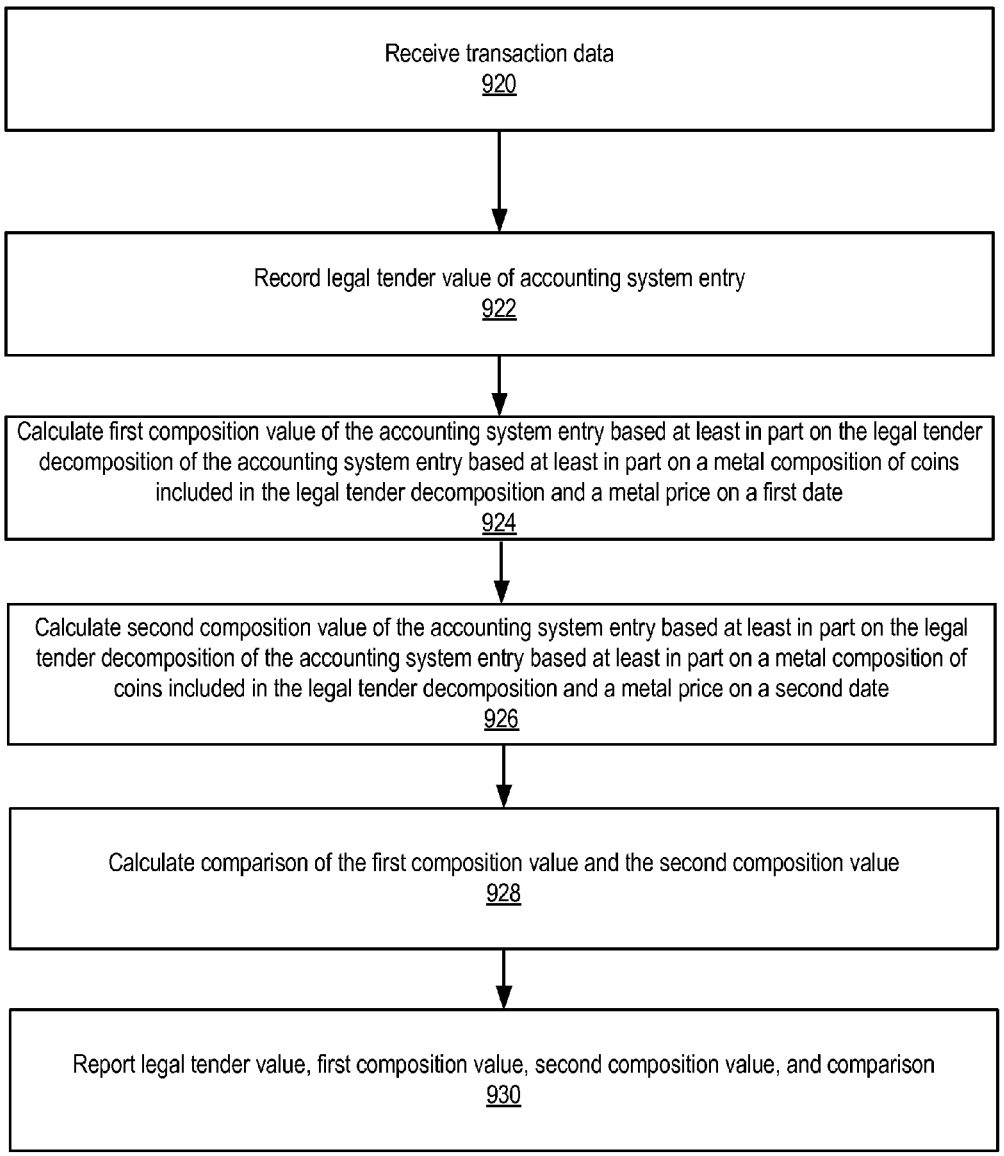
FIG. 9B is a high-level logical flowchart of operations that can be used for recording decomposition of accounting system entries with accounting computation for variable composition value, according to some embodiments.

FIG. 9B is a high-level logical flowchart of operations that can be used for a recording of decomposition of accounting system entries with accounting computation for variable composition value, according to some embodiments. Transaction data is received (block 920). A legal tender value of an accounting system entry is recorded (block 922). A first composition value of the accounting system entry is calculated based at least in part on the legal tender decomposition of the accounting system entry and based at least in part on a metal composition of coins included in the legal tender decomposition and a metal price on a first date (block 924). A second composition value of the accounting system entry is calculated based at least in part on the legal tender decomposition of the accounting system entry and based at least in part on a metal composition of coins included in the legal tender decomposition and a metal price on a second date (block 926). A comparison of the first composition value and the second composition value is calculated (block 928). The legal tender value, first composition value, second composition value, and comparison are reported (block 930).

Figure 9C:
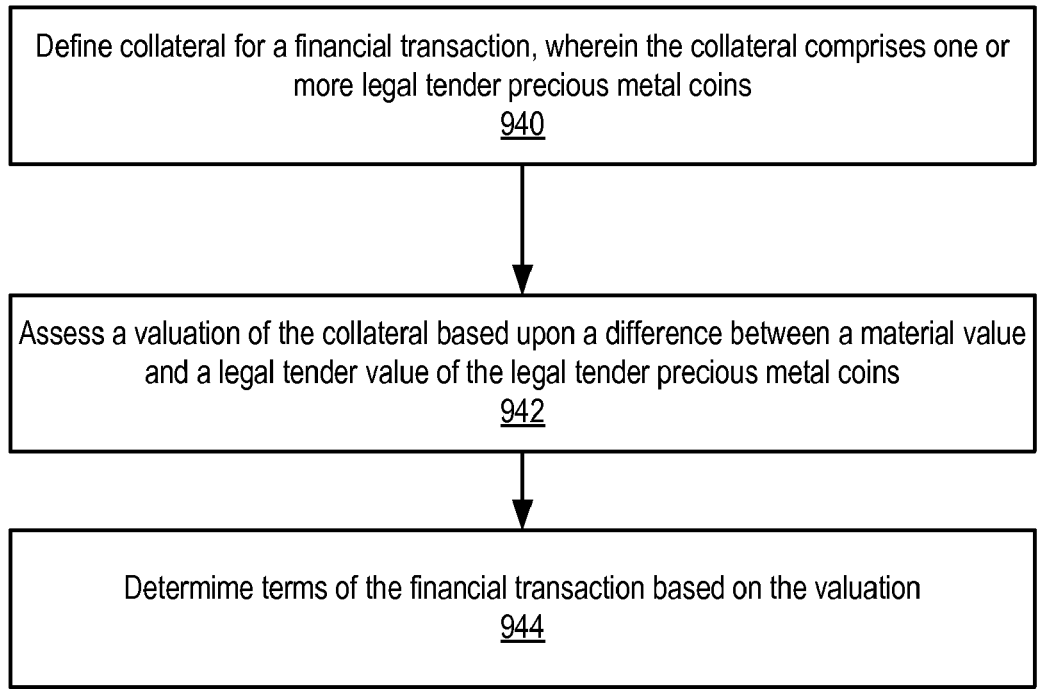
FIG. 9C is a high-level logical flowchart of operations that can be used for managing collateral-based financial transactions, according to some embodiments.

FIG. 9C is a high-level logical flowchart of operations that can be used for managing collateral-based financial transactions, according to some embodiments. Collateral for a financial transaction is defined. In some embodiments, the collateral comprises one or more legal tender precious metal coins (block 940). A valuation of the collateral based upon a difference between a material value and a legal tender value of the legal tender precious metal coins is assessed (block 942). Terms of the financial transaction are determined based on the valuation (block 944).

Figure 9D:
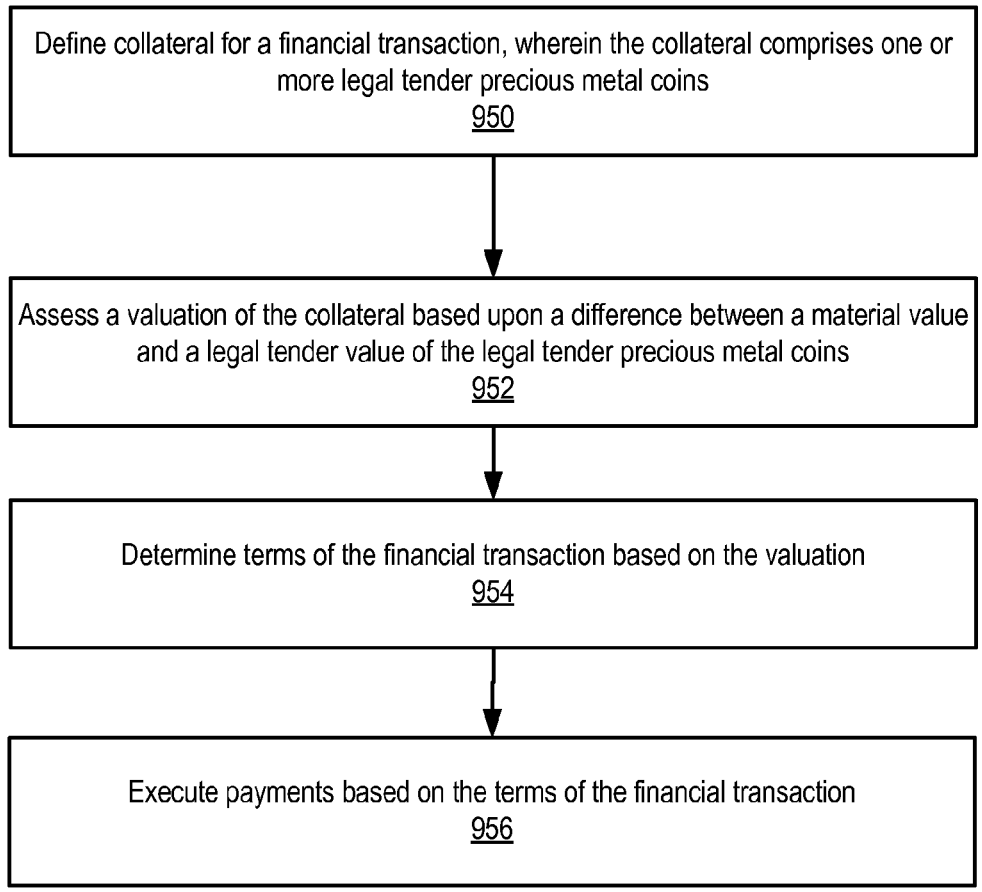
FIG. 9D is a high-level logical flowchart of operations that can be used for managing collateral-based financial transactions, according to some embodiments.

FIG. 9D is a high-level logical flowchart of operations that can be used for managing collateral-based financial transactions, according to some embodiments. Collateral for a financial transaction is defined. In some embodiments, the collateral comprises one or more legal tender precious metal coins (block 950). A valuation of the collateral based upon a difference between a material value and a legal tender value of the legal tender precious metal coins is assessed (block 952). Terms of the financial transaction are determined based on the valuation (block 954). Payments are executed based on the terms of the financial transaction (block 956).

In some embodiments, the determining the terms of the financial transaction further includes determining terms of a loan based upon the valuation. In some embodiments, the determining the terms of the financial transaction further includes determining terms of the financial transaction based on a dual treatment aggregate value of the collateral. In some embodiments, the determining the terms of the financial transaction further includes determining valuations of one or more futures contracts. In some embodiments, the determining the terms of the financial transaction further includes determining valuation of a present payment for an agreed future transfer of the collateral based on an agreed future value of the collateral. In some embodiments, the determining the terms of the financial transaction further includes determining terms of a line of credit based upon the valuation. In some embodiments, the determining the terms of the financial transaction further includes determining terms of a payment annuity based upon the valuation. In some embodiments, the determining the terms of the financial transaction further includes determining terms of an insurance contract based upon the valuation. In some embodiments, the determining the terms of the financial transaction further includes determining terms of a purchase transaction based upon the valuation.

Example Transactions Supported by Some Embodiments

Figure 10A:
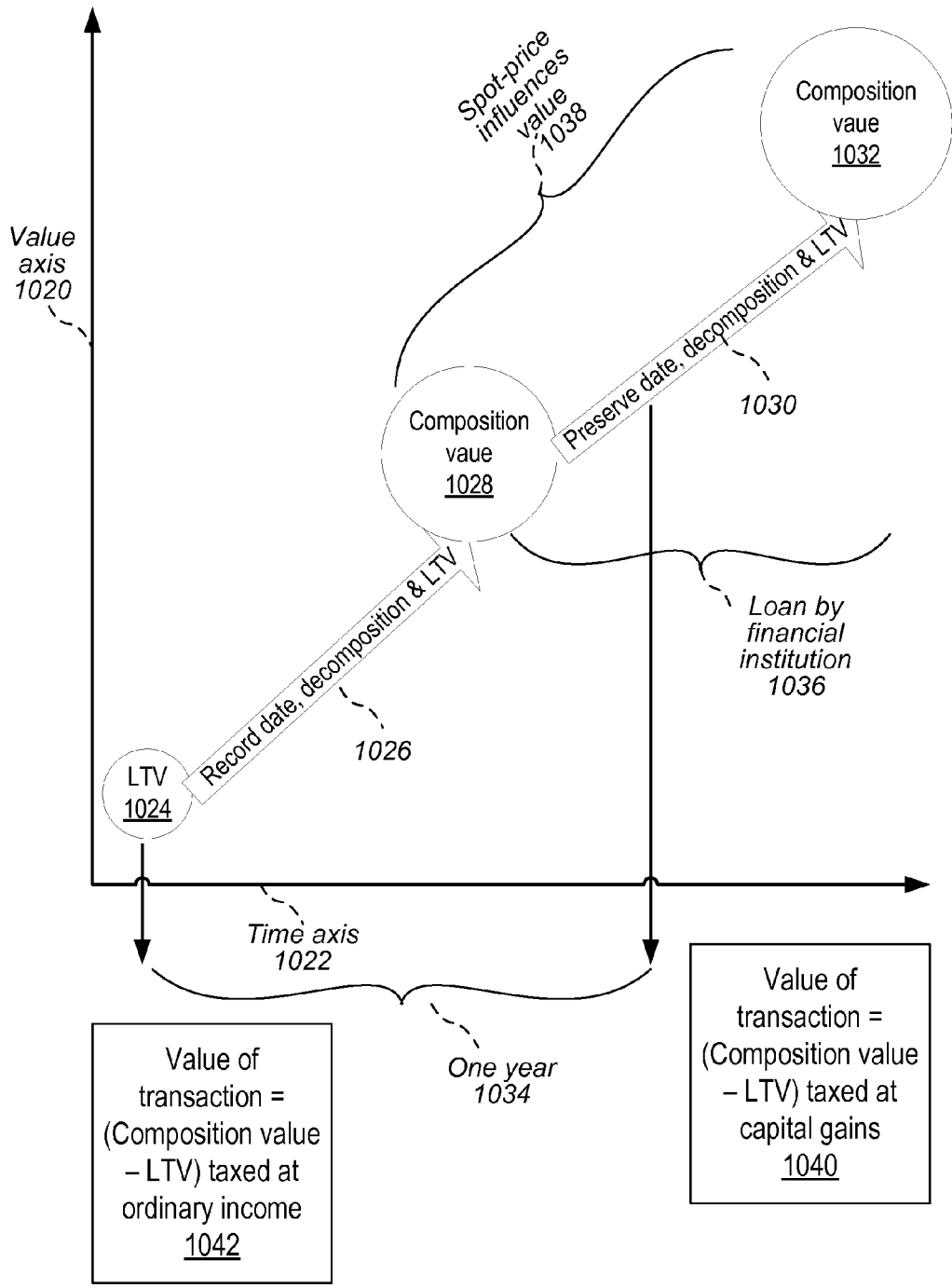
FIG. 10A is a time-value diagram of a transaction using recording of decomposition of accounting system entries with tax reporting, according to some embodiments.

FIG. 10A is a time-value diagram of a transaction using recording of decomposition of accounting system entries with tax reporting, according to some embodiments. Measured along a time axis 1022 and a time axis 1020, the transaction has a transaction value (block 1042) during an initial one-year period 1034 based on a legal tender value (LTV) 1024 subtracted from a composition value 1028 and taxed at ordinary income tax rates. Operations are performed to record the legal tender value in a currency, the legal tender decomposition in the currency and a date (block 1026). Date, legal tender decomposition, and legal tender value are preserved (block 1030) and a second composition value 1032 can be calculated as time advances and changes in the spot prices of metals influence composition value 1038. Loans by a financial institution 1036 can be initiated based on composition value 1028 or second composition value 1032. Alternative embodiments support a wide range of futures contracts, derivatives, option contracts, payment stream annuities, and other financial transactions in place of loans. After the expiration of one year 1034, a transaction value equals the subtraction of the legal tender value 1024 from a most recent composition value 1032 taxed at a capital gains tax rate (block 1040). In some embodiments, transaction values at both block 1040 and block 1042 may be reduced by subtracting an ordinary income tax levied against the legal tender value.

Figure 10B:
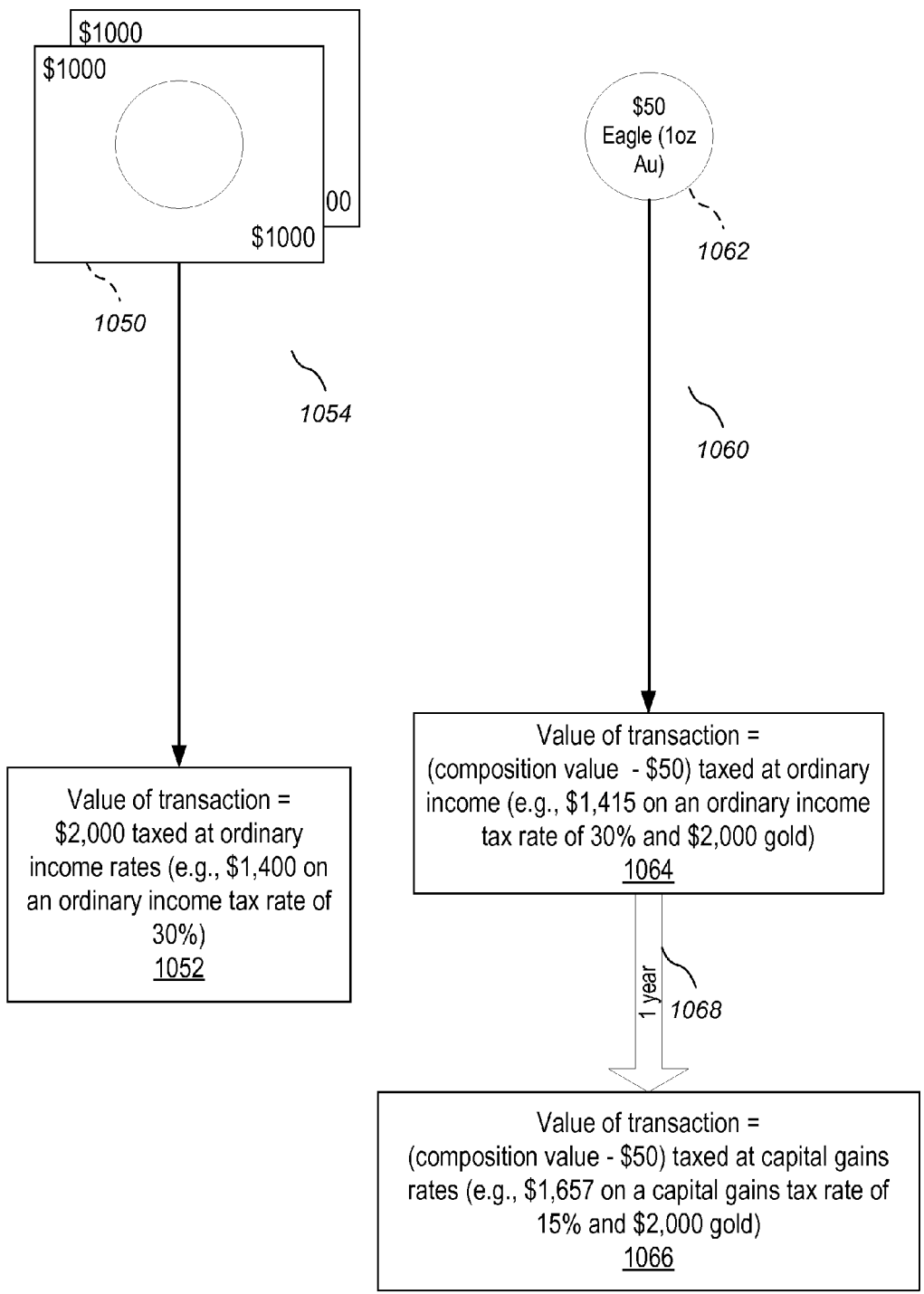
FIG. 10B is a decomposition-value diagram of a transaction using recording of decomposition of accounting system entries with tax reporting, according to some embodiments.

FIG. 10B is a decomposition-value diagram of a transaction using recording of decomposition of accounting system entries with tax reporting, according to some embodiments. In a first transaction 1054, two $1000 Federal Reserve notes (FRNs) 1050 are received. The transaction has a value of $2000 taxed at ordinary income rates, which works out to $1400 on an ordinary income tax rate of 30% (block 952). Alternatively, in a second transaction 1060, a $50 gold eagle 962, with a composition of one ounce 0.999 gold, 1062 is received. The transaction has an immediate value of composition value less legal tender value taxed at ordinary income rates, which works out to $1415 on an ordinary income tax rate of 30% and $2000 gold (block 1064). One year later 1068, the tax treatment changes such that the transaction has a second value of composition value less legal tender value taxed at capital gains rates, which works out to $1657 on an capital gains tax rate of 15% and $2000 gold (block 1066).

Figure 10C:
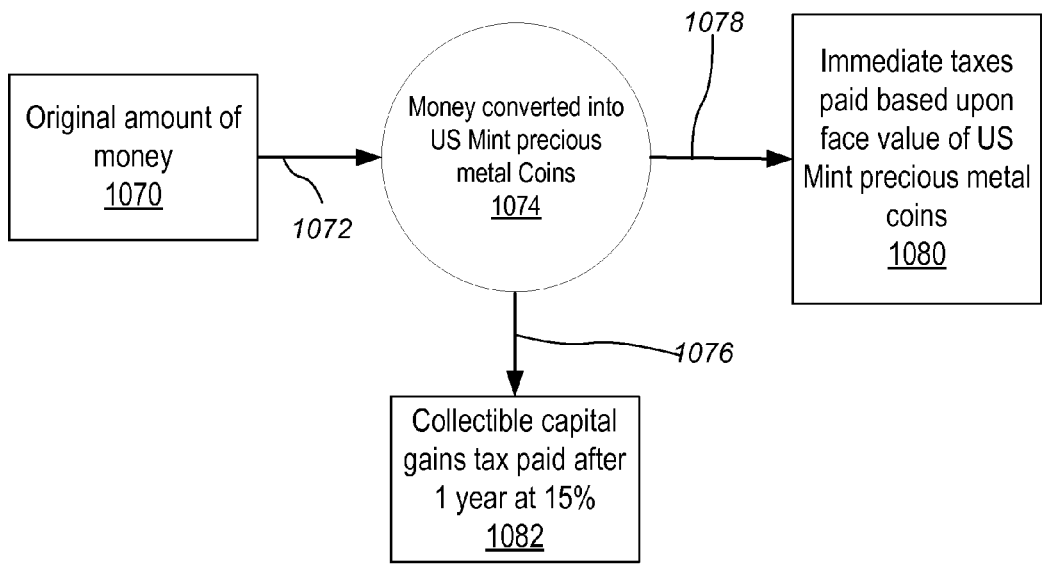
FIG. 10C is a flow of finance diagram describing a transaction using recording of decomposition of accounting system entries with tax reporting, according to some embodiments.
Figure 10D:
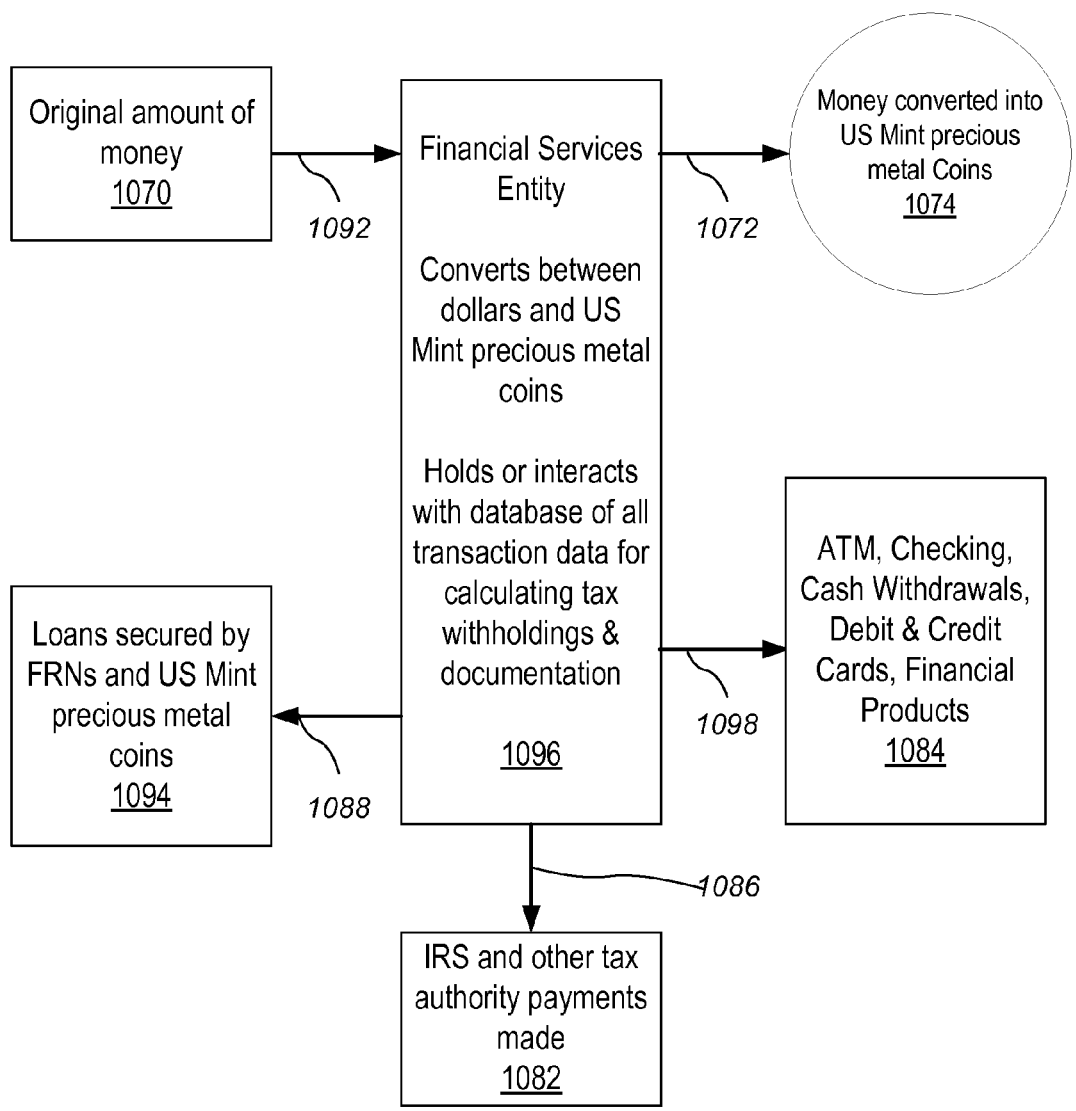
FIG. 10D is a flow of finance diagram describing a transaction using recording of decomposition of accounting system entries with tax reporting, according to some embodiments.

FIG. 10C is a flow of finance diagram describing a transaction using recording of decomposition of accounting system entries with tax reporting, according to some embodiments. FIG. 10D is a flow of finance diagram describing institutional involvement in a transaction using recording of decomposition of accounting system entries with tax reporting, according to some embodiments. An amount of money 1070, which may be subject to a form of taxes including, but not limited to, gift taxes, estate taxes, inheritance taxes, income taxes, social security taxes, etc. is converted 1072 into US Mint precious metal coins 1074. Conversion 1072 is equivalent to exchanging some form of legal tender for an equivalent amount of legal tender in a different format. An example could include, for example, exchanging four quarters for a single one dollar bill.

In this case, the conversion 1072 is between a sum of money 1070 and the precious metal value of the US Mint precious metal coins 1074. For example, if the spot price of gold is $1,000 per ounce and a taxpayer has a lump sum amount 1070 of cash equaling $1,000, then the taxpayer could buy a single one-ounce $50 American Eagle gold coin 1074. In some embodiments, an accounting software system would record the date, amounts, price of precious metals and number of coins purchased during conversion 1072 in order to calculate the timing of the future sale of the gold coin in order to ensure that the collectible capital gains tax paid 1082 occurs after at least one year has passed 1076. The taxpayer may owe taxes immediately for the transaction 1080, but those taxes paid would be calculated based upon the legal tender value of the coins that were acquired 1074.

In some embodiments, financial services supported by the embodiment are provided by an entity 1096 including, but not limited to, a bank, savings and loan, a trust, a mutual fund, an employment agency, a school, a financial advisory firm, an investment bank, an asset management firm, a hedge fund, an insurance company, an annuity company, etc. A taxpayer's money 1072 can be deposited 1092 into the financial institution 1096. While the money resides in the financial institution 1096, it can be freely converted 1072 into US Mint precious metal coins 1074. The financial institution need not actually have a all of the coins in its possession 1074 for all of the taxpayer's funding 1070. Like most commercial banks that use fractional reserve banking, the financial institution 1096 can have a limited number of US Mint precious metal coins in it's possession, so long as its ratio of holdings to committed funds remains in line with the law.

Once a taxpayer's funds 1070 have been deposited 1092 into the financial institution 1096, the IRS' "one-year clock" for long-term capital gains starts. If the taxpayer wants or needs access to his funding 1088 before the one-year is up, the financial institution 1096 can make him a loan 1094 so that the US Mint precious metal coins are not sold early and taxed at a higher rate. If the taxpayer wants to access his money 1098 after the one year capital gains milestone has been passed, he may access his funds a number of ways 1084, including but not limited to, ATM cash machine withdrawals, debit and credit card transactions, checking accounts, cash withdrawals, stock purchases, bond purchases, etc.

The various transactions 1084 cause the financial institution 1096 to execute virtual US Mint precious metal coin sales 1074 that result in capital gains taxes being incurred 1086. The financial institution can pay those taxes on behalf of the taxpayer 1082 and provide the taxpayer with tax forms and other information through the mail, email, Internet and other forms of notification.

Financial service entity automates collection, recording, management and reporting of data so that taxes can be dynamically determined and paid, so the tax complexity of the transactions are invisible to the taxpayer at the time of the transactions. If the taxpayer tries to withdraw money too soon, the system can automate the creation and issuance of a loan secured by the cash 1070 and the US Mint precious metal coins 1074 already in the possession of the financial services entity 1096.

Example User Interface

FIG. 11 depicts one embodiment of a graphical user interface for recording decomposition of accounting system entries. A transaction interface 1100 presents a report of a transaction in which a record of a first note 1122 and a record of a second note 1124 were recorded along with totals 1126 for the transaction, including a stated value 1136. In one embodiment represents, stated value 1136 represents an intended value of the transaction. For example, a transaction in which gold eagle with a composition value of $2000 and legal tender value of $50 was received with a $100 FRN may have a stated value of $2100. A value lookup control 1102 enables an accounting system to lookup composition values based on a spot price 1138 of one or more precious metals for a composition date 1104, and tax treatments are calculated between a date received 1134 and composition date 1104, with a notation of a date on which preferred tax treatment will become or did become available 1106.

A preferred tax treatment 1130 is indicated, as is a currency in which record of a first note 1122 record of a first coin 1124 were recorded. In the embodiment shown in FIG. 11, record of a first note 1122 record of a first coin 1124 are elements of a legal tender decomposition of an accounting entry and total 1126 of legal tender value 1114 is a legal tender value of the accounting entry. Each of record of a first note 1122 record of a first coin 1124 includes an element identifier 1108, an identity 1110 of a coin or bank note, a quantity 1112, a legal tender value 1114 a composition value 1116, a tax paid at ordinary income rates on the received date 1140, a tax due 1118 to be paid to close a tax transaction on the composition date 1104, and a transaction value 1120. In some embodiments, transaction value 1120 is a dual-treatment aggregate value. In some embodiments, transaction value 1120 is used to support financial transactions such as loans, option contracts, futures contracts, or payment contracts secured by the assets represented by the legal tender decomposition.

An indication of tax savings 1142 is provided. A unit of currency 1132 in which a legal tender value and a legal tender decomposition are defined is displayed. Embodiments support a wide range of futures contracts, derivatives, option contracts, payment stream annuities, secured transactions, loans, and other financial transactions, products, and services. In some embodiments, spot prices are replaced with futures contracts or other instruments for guaranteeing set agreed prices and resulting predictability in material values and composition values. Such embodiments support, for example, use of a futures contract to structure an inheritance transaction such that heirs take the money at a present time based on a transaction value 1120 with tax savings 1142 based on a long-term capital gains tax treatment 1130 through the intervention of a financial institution holding in inventory notes and coins representing a legal tender decomposition (e.g., a first note noted in record of first note 1122 and first coin noted in record of first coin 1124) for the appropriate period of time (e.g., 1 year) and guaranteeing a sale price, rather than the spot price at an agreed level via futures contracts.

Additionally, some embodiments support transactions with cash advances based on a loan secured by intervention of a financial institution holding in inventory notes and coins representing a legal tender decomposition (e.g., a first note noted in record of first note 1122 and first coin noted in record of first coin 1124) for the appropriate period of time (e.g., 1 year) with no guaranteed sales price. Some embodiments support cash advances based on a loan secured by intervention of a financial institution holding in inventory notes and coins representing a legal tender decomposition (e.g., a first note noted in record of first note 1122 and first coin noted in record of first coin 1124) with variable interest rates based at least in part on floating spot prices.

Figure 12A:
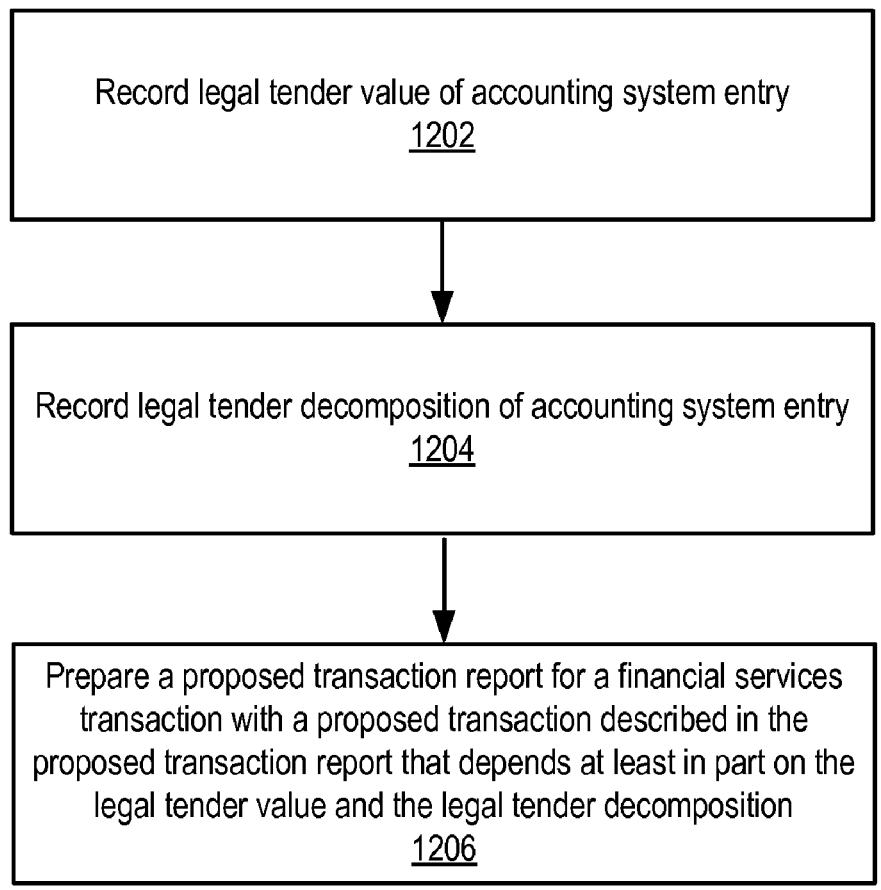
FIG. 12A is a high-level logical flowchart of operations that can be used for supporting financial services transactions based at least in part on decomposition of accounting system entries, according to some embodiments.

Example Operations for Use in Some Embodiments to Support Financial Transactions FIG. 12A is a high-level logical flowchart of operations that can be used for supporting financial services transactions based at least in part on decomposition of accounting system entries, according to some embodiments. A legal tender value of an accounting system entry is recorded (block 1202). A legal tender decomposition of an accounting system entry is recorded (block 1204). A proposed transaction report for a financial services transaction is prepared for a proposed transaction described in the proposed transaction report that depends at least in part on the legal tender value and the legal tender decomposition (block 1206).

FIG. 12B is a high-level logical flowchart of operations that can be used for preparing proposed transaction reports in support of financial services transactions based at least in part on decomposition of accounting system entries, according to some embodiments. A composition value based in part on the legal tender decomposition is calculated (block 1212). A dual-treatment aggregate value based in part on the composition value is calculated (block 1214). Terms of the financial services transaction for use in the proposed transaction report are designated (block 1216).

Example System

Figure 13:
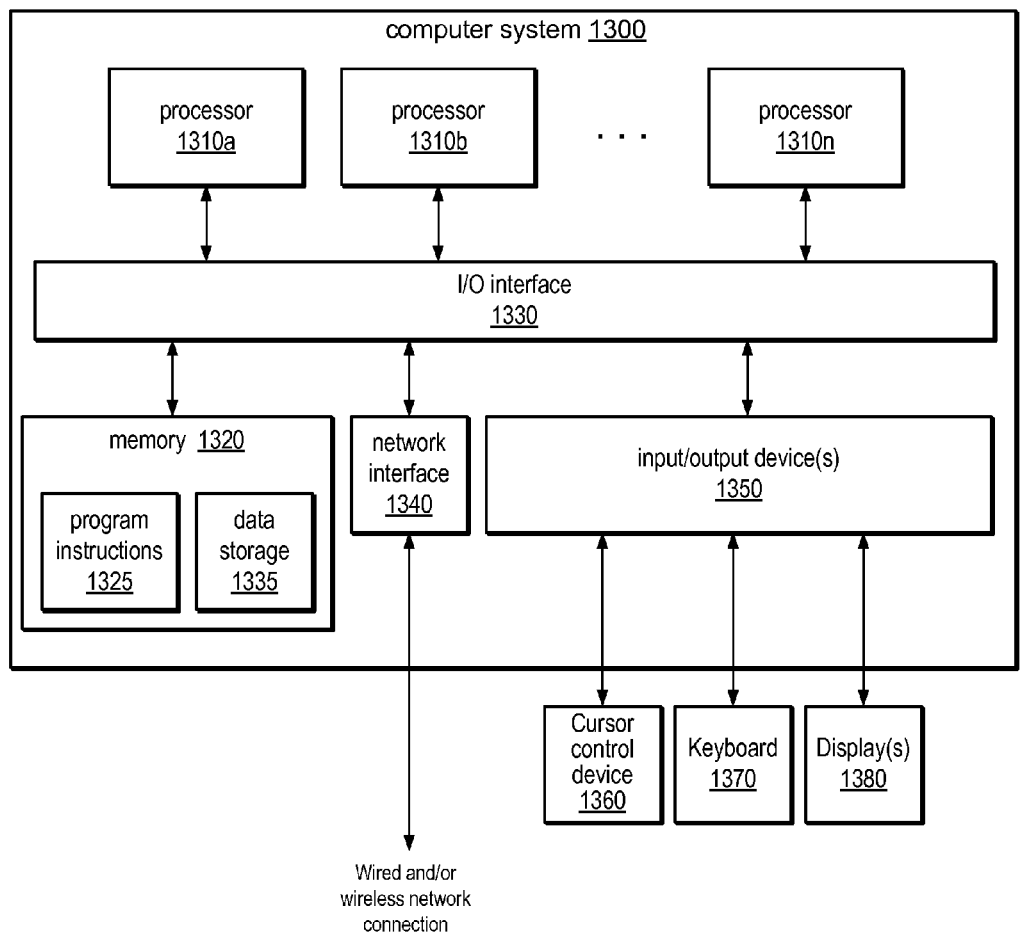
FIG. 13 illustrates an example computer system that may be used in embodiments.

Embodiments of a system and method for legal tender decompositions of accounting entries as described herein may be executed on one or more computer systems, which may interact with various other devices. One such computer system is illustrated by FIG. 13. In different embodiments, computer system 1300 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, and display(s) 1380. In some embodiments, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1320 may be configured to store program instructions and/or data accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a transaction management module are shown stored within system memory 1320 as program instructions 1325 and data storage 1335, respectively. In other embodiments, program instructions and/or data may be received, sent or stored upon different types of computer-accessible media or on similar media separate from system memory 1320 or computer system 1300. Generally speaking, a computer-accessible medium may include storage media or memory media such as magnetic or optical media, e.g., disk or CD/DVD-ROM coupled to computer system 1300 via I/O interface 1330. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1340.

In one embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. In addition, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network, such as other computer systems, or between nodes of computer system 1300. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or retrieving data by one or more computer system 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

As shown in FIG. 13, memory 1320 may include program instructions 1325, configured to implement embodiments of a decomposition recording module as described herein, and data storage 1235, comprising various data accessible by program instructions 1225. In one embodiment, program instructions 1225 may include software elements of embodiments of a transaction management module as illustrated in the above Figures. Data storage 1235 may include data that may be used in embodiments. In other embodiments, other or different software elements and data may be included.

Those skilled in the art will appreciate that computer system 1200 is merely illustrative and is not intended to limit the scope of a transaction management module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:
1. A method, the method comprising:
  using one or more processors to perform
    defining collateral to be used in a financial transaction for a customer, wherein
      the collateral comprises one or more legal tender precious metal coins;

recording for each of the one or more legal tender precious metal coins a type of coin;

recording an intrinsic material value of the one or more legal tender precious metal coins;

recording a date on which the one or more legal tender precious metal coins are used in the financial transaction; and assessing and recording a valuation of the collateral based at least in part upon a future intrinsic material value of the legal tender precious metal coins.

2. The method of claim 1, further comprising recording a legal tender value of the one or more legal tender precious metal coins.

3. The method of claim 1, wherein
the assessing the valuation of the collateral further comprises assessing a valuation of the collateral based at least in part upon:
a difference between the intrinsic material value and the legal tender value of the legal tender precious metal coins; and
a time period over which the collateral will be held by a depository for use in the financial transaction.

4. The method of claim 1, further comprising determining valuations of one or more futures contracts.

5. The method of claim 1, wherein the method further comprises executing payments based on the terms of the financial transaction.

6. The method of claim 1, further comprising determining terms of the financial transaction.

7. The method of claim 1, wherein the the assessing the valuation of the collateral further comprises assessing a valuation of the collateral based at least in part upon: a futures contract for the future intrinsic material value of the legal tender precious metal coins.

8. The method of claim 1, further comprising determining terms of an insurance contract based upon the valuation.

9. The method of claim 1, further comprising determining terms of a purchase transaction based upon the valuation.

10. The method of claim 1, further comprising determining valuation of a present payment for an agreed future transfer of the collateral based on an agreed future value of the collateral.

11. A system, comprising:
at least one processor; and
a memory comprising program instructions, wherein the program instructions are executable by the at least one processor to:
define collateral to be used in a financial transaction for a customer,
wherein
the collateral comprises one or more legal tender precious metal coins;
record for each of the one or more legal tender precious metal coins a type of coin;
record an intrinsic material value of the one or more legal tender precious metal coins;
record a date on which the one or more legal tender precious metal coins are used in the financial transaction; and
assess and record a valuation of the collateral based at least in part upon a future intrinsic material value of the legal tender precious metal coins.

12. The system of claim 11, wherein the program instructions executable by the at least one processor further comprise program instructions executable by the at least one processor to determine terms of a loan based upon the valuation.

13. The system of claim 11, wherein the program instructions executable by the at least one processor further comprise program instructions executable by the at least one processor to determine terms of the financial transaction based on a dual treatment aggregate value of the collateral.

14. The system of claim 11, wherein the program instructions executable by the at least one processor further comprise program instructions executable by the at least one processor to determine valuations of one or more futures contracts.

15. The system of claim 11, further comprising program instructions executable by the at least one processor to execute payments based on the terms of the financial transaction.

16. The system of claim 11, wherein the program instructions executable by the at least one processor further comprise program instructions executable by the at least one processor to determine terms of a line of credit based upon the valuation.

17. The system of claim 11, wherein the program instructions executable by the at least one processor further comprise program instructions executable by the at least one processor to determine terms of a payment annuity based upon the valuation.

18. The system of claim 11, wherein the program instructions executable by the at least one processor further comprise program instructions executable by the at least one processor to determine terms of an insurance contract based upon the valuation.

19. The system of claim 11, wherein the program instructions executable by the at least one processor further comprise program instructions executable by the at least one processor to determine terms of a purchase transaction based upon the valuation.

20. The system of claim 11, wherein the program instructions executable by the at least one processor further comprise program instructions executable by the at least one processor to determine valuation of a present payment for an agreed future transfer of the collateral based on an agreed future value of the collateral.

21. A non-transitory computer-readable storage medium storing program instructions, wherein the program instructions are computer-executable to implement:
defining collateral to be used in a financial transaction for a customer, wherein the collateral comprises one or more legal tender precious metal coins;
recording for each of the one or more legal tender precious metal coins a type of coin;
recording an intrinsic material value of the one or more legal tender precious metal coins;
recording a date on which the one or more legal tender precious metal coins are used in the financial transaction; and
assessing and recording a valuation of the collateral based at least in part upon a future intrinsic material value of the legal tender precious metal coins.

22. The system of claim 21, further comprising program instructions computer-executable to implement determining terms of a loan based upon the valuation.

23. The system of claim 21, further comprising program instructions computer-executable to implement determining terms of the financial transaction based on a dual treatment aggregate value of the collateral.

24. The system of claim 21, further comprising program instructions computer-executable to implement determining valuations of one or more futures contracts.

25. The system of claim 21, further comprising program instructions computer-executable implement executing payments based on the terms of the financial transaction.

26. The system of claim 21, further comprising program instructions computer-executable to implement determining terms of a line of credit based upon the valuation.

27. The system of claim 21, further comprising program instructions computer-executable to implement determining terms of a payment annuity based upon the valuation.

28. The system of claim 21, further comprising program instructions computer-executable to implement determining terms of an insurance contract based upon the valuation.

29. The system of claim 21, further comprising program instructions computer-executable to implement determining terms of a purchase transaction based upon the valuation.

30. The system of claim 21, further comprising program instructions computer-executable to implement determining valuation of a present payment for an agreed future transfer of the collateral based on an agreed future value of the collateral.

* * * * *

UNITED STATES PATENT AND TRADEMARK OFFICE
CERTIFICATE OF CORRECTION

PATENT NO. : 8,311,917 B2
APPLICATION NO. : 13/282209
DATED : November 13, 2012
INVENTOR(S) : Omar Besim Hakim Page 1 of 1

It is certified that error appears in the above-identified patent and that said Letters Patent is hereby corrected as shown below:

In The Claims:

Claim 7, column 27, line 30, after "wherein the" please delete "the".

Signed and Sealed this
Twenty-ninth Day of January, 2013

David J. Kappos
*Director of the United States Patent and Trademark Office*